(12) United States Patent
Zhao

(10) Patent No.: US 11,706,254 B2
(45) Date of Patent: Jul. 18, 2023

(54) METHOD AND APPARATUS FOR IDENTIFYING ENCRYPTED DATA STREAM

(71) Applicant: Huawei Technologies Co., Ltd., Shenzhen (CN)

(72) Inventor: Yong Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 16/874,237

(22) Filed: May 14, 2020

(65) Prior Publication Data

US 2020/0280584 A1 Sep. 3, 2020

Related U.S. Application Data

(63) Continuation of application No. PCT/CN2018/116207, filed on Nov. 19, 2018.

(30) Foreign Application Priority Data

Nov. 17, 2017 (CN) .......................... 201711141610.3

(51) Int. Cl.
*H04L 29/06* (2006.01)
*H04L 9/40* (2022.01)
(Continued)

(52) U.S. Cl.
CPC ............ *H04L 63/16* (2013.01); *H04L 43/026* (2013.01); *H04L 63/0428* (2013.01); *H04L 63/1408* (2013.01); *H04L 69/22* (2013.01)

(58) Field of Classification Search
CPC ..... H04L 63/16; H04L 41/16; H04L 63/1408; H04L 69/22; H04L 63/166; H04L 63/0428
(Continued)

(56) References Cited

U.S. PATENT DOCUMENTS 7,778,194 B1 * 8/2010 Yung ...................... H04L 47/10
370/252
9,112,907 B2 8/2015 Krieger et al.
(Continued)

FOREIGN PATENT DOCUMENTS

CN 1642138 A 7/2005
CN 101741644 A 6/2010
(Continued)

OTHER PUBLICATIONS

Ding, R., "A Hybrid Method for Service Identification of SSL/TLS Encrypted Traffic," 2nd IEEE International Conference on Computer and Communications, Oct. 14-17, 2016, pp. 250-253.
(Continued)

*Primary Examiner* — Saleh Najjar
*Assistant Examiner* — Peiliang Pan
(74) *Attorney, Agent, or Firm* — Conley Rose, P.C.

(57) ABSTRACT

A method includes parsing a handshake message of an encrypted data stream according to a secure encrypted transmission protocol corresponding to the encrypted data stream, to obtain a plurality of fields included in the handshake message, determining, from a plurality of rule sets and based on the plurality of fields, a rule set that matches the handshake message, and determining, based on a mapping relationship between the matched rule set and an application, an application corresponding to the encrypted data stream.

20 Claims, 9 Drawing Sheets

(51) Int. Cl.
  *H04L 43/026* (2022.01)
  *H04L 69/22* (2022.01)
(58) Field of Classification Search
  USPC .......................................................... 713/151
  See application file for complete search history.

(56) References Cited

U.S. PATENT DOCUMENTS

| | | | | |
|---|---|---|---|---|
| 9,118,484 | B1* | 8/2015 | Naik | H04L 9/3263 |
| 9,119,109 | B1* | 8/2015 | Dubrovsky | H04L 47/2433 |
| 9,237,168 | B2 | 1/2016 | Wang et al. | |
| 9,716,617 | B1* | 7/2017 | Ahuja | H04L 67/1001 |
| 9,781,081 | B1* | 10/2017 | Wasiq | H04L 63/166 |
| 9,792,447 | B2* | 10/2017 | Thota | H04L 63/1441 |
| 9,800,560 | B1* | 10/2017 | Guo | H04L 9/0822 |
| 10,725,747 | B1* | 7/2020 | Nene | G06F 8/35 |
| 2010/0318784 | A1 | 12/2010 | Rao et al. | |
| 2012/0278886 | A1* | 11/2012 | Luna | H04L 63/1408 726/22 |
| 2013/0312054 | A1 | 11/2013 | Wang et al. | |
| 2014/0101764 | A1* | 4/2014 | Montoro | G06F 21/56 726/23 |
| 2014/0359700 | A1 | 12/2014 | Krieger et al. | |
| 2015/0078384 | A1* | 3/2015 | Jackson | H04L 45/745 370/392 |
| 2015/0281408 | A1* | 10/2015 | Kwan | H04L 12/4641 370/474 |
| 2016/0087871 | A1* | 3/2016 | Dixon | H04L 67/125 370/392 |
| 2016/0105471 | A1* | 4/2016 | Nunes | H04L 12/4633 709/228 |
| 2016/0119198 | A1* | 4/2016 | Kfir | H04L 69/22 709/224 |
| 2016/0134646 | A1 | 5/2016 | Wing et al. | |
| 2016/0255118 | A1* | 9/2016 | Wang | H04L 63/104 726/1 |
| 2016/0316045 | A1* | 10/2016 | Treves | H04L 69/22 |
| 2017/0118189 | A1* | 4/2017 | Venkatakrishnan | G06Q 20/10 |
| 2017/0223054 | A1 | 8/2017 | Wing et al. | |
| 2017/0279971 | A1* | 9/2017 | Raleigh | H04W 60/06 |
| 2017/0373860 | A1* | 12/2017 | Kshirsagar | H04L 63/0823 |
| 2018/0069838 | A1* | 3/2018 | Lee | G06V 20/41 |
| 2018/0139214 | A1* | 5/2018 | Anderson | H04L 63/1408 |
| 2018/0176102 | A1* | 6/2018 | Bansal | H04L 63/0263 |
| 2018/0176252 | A1* | 6/2018 | Nimmagadda | H04L 43/04 |
| 2018/0189677 | A1* | 7/2018 | Anderson | G06N 20/00 |
| 2018/0203731 | A1* | 7/2018 | Rapp | G06Q 50/01 |
| 2018/0302328 | A1* | 10/2018 | Keith | H04L 47/24 |
| 2019/0036956 | A1* | 1/2019 | Gunda | H04L 41/046 |
| 2019/0081983 | A1* | 3/2019 | Teal | H04L 43/045 |
| 2019/0141156 | A1* | 5/2019 | Srinivasulu | H04L 67/2823 |
| 2019/0220705 | A1* | 7/2019 | Min | G06K 9/6231 |
| 2020/0045519 | A1* | 2/2020 | Raleigh | H04W 4/24 |

FOREIGN PATENT DOCUMENTS

| | | |
|---|---|---|
| CN | 101296228 B | 10/2010 |
| CN | 101909077 A | 12/2010 |
| CN | 103618726 A | 3/2014 |
| CN | 103873320 A | 6/2014 |
| CN | 104322001 A | 1/2015 |
| CN | 104660636 A | 5/2015 |
| CN | 102984243 B | 5/2016 |
| CN | 105871832 A | 8/2016 |
| CN | 106209775 A | 12/2016 |
| CN | 107135190 A | 9/2017 |
| GB | 2450897 A | 1/2009 |
| WO | 2017079980 A1 | 5/2017 |

OTHER PUBLICATIONS

Velan, P., "A Survey of Methods for Encrypted Traffic Classification and Analysis," International Journal of Network Management, Jul. 2015, vol. 25 No. 5, pp. 355-374.

Shen, M., "Classification of Encrypted Traffic with Second-Order Markov Chains and Application Attribute Bigrams," IEEE Transactions on Information Forensics and Security, vol. 12, No. 8, Aug. 2017, pp. 1830-1843.

Shi, H., et al., "Efficient and Robust Feature Extraction and Selection for Traffic Classification," Computer Networks, vol. 119, Jun. 2017, 16 pages.

Wang, W., "End-to-end Encrypted Traffic Classification with One-dimensional Convolution Neural Networks," IEEE International Conference on Intelligence and Security Informatics, Jul. 22-24, 2017, pp. 43-48.

Anderson, B., "Machine Learning for Encrypted Malware Traffic Classification: Accounting for Noisy Labels and Non-Stationarity," Proceedings of the 23rd ACM SIGKDD International Conference on Knowledge Discovery and Data Mining, ACM, Aug. 13-17, 2017, pp. 1723-1732.

Fu, P., et al., "Research on Fine-Grained Classification Technology of Network Application Based on Ssl Protocol," Beijing University of Posts and Telecommunications, 2013, 91 pages. With partial English translation.

* cited by examiner

METHOD AND APPARATUS FOR IDENTIFYING ENCRYPTED DATA STREAM

CROSS-REFERENCE TO RELATED APPLICATIONS

This application is a continuation of International Patent Application No. PCT/CN2018/116207, filed on Nov. 19, 2018, which claims priority to Chinese Patent Application No. 201711141610.3, filed on Nov. 17, 2017. The disclosures of the aforementioned applications are hereby incorporated by reference in their entireties.

TECHNICAL FIELD

The present disclosure relates to the computer field, and in particular, to a method and an apparatus for identifying an encrypted data stream.

BACKGROUND

As the Internet is rapidly popularized and developed by virtue of its features such as openness and shareability, more new network applications start to exist. Openness of the Internet also means that any device or software meeting Internet technical standards can access the Internet without restriction. To effectively supervise and manage a network, and improve network controllability, for example, to efficiently utilize bandwidth and provide better quality of service (QoS), or to improve network security and reduce behavior such as cybercrimes, a key problem to be resolved is how to identify traffic in the network, for example, to classify traffic from the perspective of a data stream, and more specifically, to determine an application to which a data stream in the network belongs, that is, to determine an application whose data is carried in the data stream.

Common secure encrypted transmission protocols below an application layer include the Secure Socket Layer (SSL) protocol, the Transport Layer Security (TLS) protocol, the Datagram Transport Layer Security (DTLS) protocol, and the like. The TLS protocol may be considered as an upgraded version of the SSL protocol. The DTLS protocol is based on the TLS protocol and is used to protect security of data transmission on a User Datagram Protocol (UDP) connection. A data stream transmitted using the secure encrypted transmission protocol in a network is referred to as an encrypted data stream (encrypted stream), and traffic of the encrypted stream is also referred to as encrypted traffic. It is relatively difficult to parse the encrypted stream at an end other than a transmit end and a receive end of the data stream. Therefore, it is a major technical difficulty in the industry to identify an application to which encrypted traffic transmitted in a network belongs.

Using the TLS protocol as an example, encrypted traffic may be identified by parsing a Server Name Indication (SNI) field in a handshake message. The SNI field is a field in a handshake message Client Hello, and is used to indicate a domain name (or called "Host Name") corresponding to an encrypted stream in which the handshake message Client Hello is located. Alternatively, encrypted traffic may be identified by parsing a common name field in a handshake message. The common name field is a field in a subject domain of a handshake message Certificate, and includes information indicating a domain name corresponding to an encrypted stream in which the handshake message certificate is located.

However, in many scenarios, it may be set that the foregoing fields carry erroneous information or fuzzy information (such as a wildcard character), or the foregoing fields may not exist in a TLS message. Therefore, an application corresponding to the encrypted traffic cannot be correctly identified using a single SNI field or common name field.

SUMMARY

Embodiments of this application provide a method and an apparatus for identifying an encrypted data stream such that encrypted traffic in a network can be identified more accurately. In other words, more encrypted data streams can be identified more accurately, where "identified" means that an application corresponding to the encrypted data stream is identified.

According to a first aspect, this application records a method for identifying an encrypted data stream. The method includes parsing a plurality of handshake messages of an encrypted data stream according to a secure encrypted transmission protocol corresponding to the encrypted data stream, to obtain a plurality of fields included in the plurality of handshake messages, determining, from a plurality of rule sets and based on the plurality of fields, a rule set that matches the plurality of handshake messages, where each of the plurality of rule sets includes at least one of a field rule or an order rule, the field rule is used to indicate a feature of a field, the order rule is used to indicate an order of a plurality of fields in a handshake message, and the fields in the plurality of handshake messages meet a rule in the matched rule set, and determining, based on a mapping relationship between the matched rule set and an application, an application corresponding to the encrypted data stream.

The fields in the plurality of handshake messages in the encrypted data stream are parsed, and the fields are matched with the plurality of rule sets, to find the rule set corresponding to the plurality of handshake messages, and then, an application in a mapping relationship with the rule set is determined using the rule set. In this way, identification no longer relies on domain name information that is easily tampered with or inaccurate in the handshake message, applications corresponding to more encrypted data streams can be identified, and accuracy of identifying the encrypted data stream can be improved.

It should be understood that the plurality of fields come from the plurality of handshake messages.

It should be understood that the plurality of rule sets are more than one rule set. The determining, from a plurality of rule sets, a rule set that matches the plurality of handshake messages means that the rule set that matches the plurality of handshake messages is determined from the more than one rule set. In other words, the plurality of rule sets also include at least one of a field rule or an order rule.

It should be understood that "parsing a plurality of handshake messages of an encrypted data stream according to a secure encrypted transmission protocol corresponding to the encrypted data stream" should be understood by a person skilled in the art. For example, in an implementation, a plurality of fields in a plurality of handshake messages of an encrypted data stream are obtained through parsing based on information such as a definition of a field in a handshake message in a secure encrypted transmission protocol corresponding to the encrypted data stream.

In an implementation, each of the plurality of rule sets corresponds to a unique application.

In an implementation, each of the plurality of rule sets is in a mapping relationship with one application.

In an implementation, the plurality of handshake messages meet all rules in the matched rule set. For example, the rule set that matches the plurality of handshake messages includes only at least one of a field rule or an order rule, and the fields in the plurality of handshake messages meet all the rules in the matched rule set. In an implementation, the plurality of handshake messages meet some rules in the matched rule set. This implementation is specific to some cases in which due to special settings of some rule sets, the rule set corresponding to the plurality of handshake messages can be determined and the application corresponding to the encrypted data stream can be determined without matching all rules in a rule set (for example, some rules are optional).

In an implementation, the plurality of fields include a plurality of groups, each of the plurality of groups corresponds to one handshake message, and the determining, from a plurality of rule sets and based on the plurality of fields, a rule set that matches the plurality of handshake messages includes matching the plurality of groups with rules in the plurality of rule sets in an order of receiving the plurality of handshake messages, to obtain, from the plurality of rule sets, the rule set that matches the plurality of handshake messages. Similarly, in an implementation, the plurality of groups may be alternatively matched with rules in the plurality of rule sets in a time sequence of the plurality of handshake messages, to obtain, from the plurality of rule sets, the rule set that matches the plurality of handshake messages. The time sequence is a specified handshake message exchange sequence in a handshaking phase. In this way, an encrypted stream can start to be identified before all subsequent handshake messages arrive. In addition, because rules included in different rule sets correspond to different handshake messages, some applications whose rules are distributed only in the first several handshake messages can be identified faster. In an implementation of an apparatus according to a third aspect, a matching module in the apparatus according to the third aspect may be configured to implement this step.

In an implementation, the plurality of rule sets include field rules and order rules, and the determining, from a plurality of rule sets and based on the plurality of fields, a rule set that matches the plurality of handshake messages includes separately matching the plurality of fields with the field rules and the order rules in the plurality of rule sets, to determine, from the plurality of rule sets, the rule set that matches the plurality of handshake messages. In this way, different types of rules in the rule sets are matched, and batch processing can be implemented, increasing a matching speed. In an implementation of the apparatus according to the third aspect, the matching module in the apparatus according to the third aspect may be configured to implement this step.

In an implementation, the matched rule set includes a plurality of subsets, each of the plurality of subsets corresponds to at least one application, and the determining, based on a mapping relationship between the matched rule set and an application, an application corresponding to the encrypted data stream includes obtaining, based on a mapping relationship between each of the plurality of subsets and an application, a plurality of application sets corresponding to the plurality of subsets, and solving for an intersection set of the plurality of application sets, to obtain a unique application corresponding to the rule set, where the application is the application corresponding to the encrypted data stream. In an implementation, each of the plurality of rule sets may include a plurality of subsets, packets corresponding to rules in each subset have a same name, and packets corresponding to different subsets in a same rule set have different names. In other words, there are various representations for a mapping relationship between a rule set and an application. In this way, the plurality of packets can be matched with the rules and mapped to applications one by one in parallel or in serial such that identification of the encrypted stream can be accelerated. In an implementation of the apparatus according to the third aspect, a determining module in the apparatus according to the third aspect may be configured to implement this step.

In an implementation, the plurality of rule sets include a plurality of rules stored in a form of a linked list, and each node in the linked list stores a rule corresponding to a name of one handshake message. In this way, the rules in the rule sets can be better and more orderly managed, one-by-one matching of handshake messages can be facilitated, and the encrypted stream can be identified faster.

In an implementation, the parsing a plurality of handshake messages of an encrypted data stream includes performing the following operations on each of the plurality of handshake messages of the encrypted data stream, parsing a name of the handshake message, determining, from the plurality of rule sets and based on the name of the handshake message, at least one rule corresponding to the name of the handshake message, and parsing a field in the handshake message that is indicated by the at least one rule. In this way, only a field required in a subsequent step may be parsed, to reduce a processing amount in a parsing step such that an identification process is faster, and resources consumed in the parsing step are reduced. In an implementation of the apparatus according to the third aspect, a parsing module in the apparatus according to the third aspect may be configured to implement this step.

In an implementation, the method further includes training a plurality of samples of a plurality of encrypted data streams using a machine learning algorithm, to obtain at least one rule set corresponding to a target application, where whether the plurality of samples are handshake messages of an encrypted data stream corresponding to the target application is known, and the plurality of samples include the handshake message of the encrypted data stream corresponding to the target application. In other words, the rule set and the mapping relationship between a rule set and an application may be obtained through training using the machine learning algorithm. In this way, the obtained information can more accurately describe a correspondence between a packet and an application. In addition, the rule set and the correspondence between a rule set and an application may be updated in this manner. In an implementation of the apparatus according to the third aspect, the apparatus according to the third aspect may further include a training module, and the training module may be configured to implement this step.

According to a second aspect, this application records another method for identifying an encrypted data stream. The method includes parsing one handshake message of an encrypted data stream according to a secure encrypted transmission protocol corresponding to the encrypted data stream, to obtain a plurality of fields included in the handshake message, determining, from a plurality of rule sets and based on the plurality of fields, a rule set that matches the handshake message, where each of the plurality of rule sets includes at least one of a field rule or an order rule, the field rule is used to indicate a feature of a field, the order rule is used to indicate an order of a plurality of fields in a packet, and the fields in the handshake message meet a rule in the matched rule set, and determining, based on a mapping relationship between the matched rule set and an application, an application corresponding to the encrypted data stream. According to the method in the second aspect, at least one of a feature and a sequence of the plurality of fields is used such that identification no longer relies on domain name information that is easily tampered with or inaccurate in the handshake message, applications corresponding to more encrypted data streams can be identified, and accuracy of identifying the encrypted data stream can be improved.

It can be learned that, the method described in the second aspect is similar to the method described in the first aspect, and a difference lies in that in the second aspect, the application corresponding to the encrypted data stream can be identified using only one handshake message. Therefore, explanations and technical effects of the first aspect may also be applicable to corresponding parts in the second aspect, and descriptions of implementations of the steps in the second aspect, such as parsing one packet, determining a rule set that matches the handshake message, and determining an application corresponding to the encrypted data stream are also applicable to processing of the plurality of packets in the first aspect.

In an implementation, the plurality of rule sets are rule sets corresponding to a name of the handshake message. In an implementation, the parsing one handshake message of an encrypted data stream includes determining, from the plurality of rule sets, at least one rule corresponding to a name of each handshake message, and parsing a field in the handshake message that is indicated by the at least one rule. In this way, only a field required in a subsequent step may be parsed, to reduce a processing amount in a parsing step such that an identification process is faster, and resources consumed in the parsing step are reduced. In an implementation of an apparatus according to a fourth aspect, a parsing module in the apparatus according to the fourth aspect may be configured to implement this step.

In an implementation, the plurality of rule sets include field rules and order rules, and the determining, from a plurality of rule sets and based on the plurality of fields, a rule set that matches the handshake message includes separately matching the plurality of fields with the field rules and the order rules in the plurality of rule sets, to determine, from the plurality of rule sets, the rule set that matches the handshake message. In this way, different types of rules in the rule sets are matched, and batch processing can be implemented, increasing a matching speed. In an implementation of the apparatus according to the fourth aspect, a matching module in the apparatus according to the fourth aspect may be configured to implement this step.

In an implementation, the method further includes training a plurality of samples using a machine learning algorithm, to obtain at least one rule set corresponding to a target application, where whether the plurality of samples are handshake messages of an encrypted data stream corresponding to the target application is known, and the plurality of samples include the handshake message of the encrypted data stream corresponding to the target application. In an implementation of the apparatus according to the fourth aspect, the apparatus according to the fourth aspect may further include a training module, and the training module may be configured to implement this step.

Several implementations to which both the method in the first aspect and the method in the second aspect are applicable are listed below.

In the foregoing two methods, the handshake message may be actively captured by the apparatuses that perform the methods, or may be sent by another network node. Alternatively, the plurality of handshake messages may be copied from a handshake message transmitted in a network.

The parsing step in the foregoing two aspects is to parsing the handshake message of the encrypted data stream using the secure encrypted transmission protocol corresponding to the encrypted data stream, to obtain the plurality of fields included in the handshake message. The secure encrypted transmission protocol corresponding to the encrypted data stream is an SSL protocol, a TLS protocol, a DTLS protocol, or another secure encrypted transmission protocol running below an application layer. Correspondingly, in an implementation, the plurality of handshake messages are SSL handshake messages, TLS handshake messages, or DTLS handshake messages.

In an implementation, the plurality of rule sets and the mapping relationship between a rule set and an application are stored in an identification information library. The identification information library may be in a device that performs the method for identifying an encrypted data stream, or may be in another device. In other words, in an implementation, the apparatuses described in the third aspect and the fourth aspect may further include a storage module configured to store information in the identification information library.

In an implementation, a feature of a field that is indicated by a field rule is a length of the field, or a type of the field, or a length and a type of the field, or a type and a value of the field, or a length, a type, and a value of the field. In an implementation, the feature of the field is at least one of a length, a type, and a value of the field.

In an implementation, the plurality of rule sets include a plurality of rules, and the determining, from a plurality of rule sets and based on the plurality of fields, a rule set that matches the handshake message (or the plurality of handshake messages) includes matching the plurality of fields with the plurality of rules, to obtain a group of rules corresponding to the plurality of fields, and matching the group of rules with the plurality of rule sets, to obtain the rule set that matches the handshake message (or the plurality of handshake messages). In an implementation of the apparatuses according to the third aspect and the fourth aspect, the matching module in the apparatuses according to the third aspect and the fourth aspect may be configured to implement this step.

In an implementation, the determining, from a plurality of rule sets and based on the plurality of fields, a rule set that matches the handshake message (or the plurality of handshake messages) includes matching the plurality of rule sets with the plurality of fields until the rule set that matches the handshake message (or the plurality of handshake messages) is obtained. In an implementation of the apparatuses according to the third aspect and the fourth aspect, the matching module in the apparatuses according to the third aspect and the fourth aspect may be configured to implement this step.

According to a third aspect, this application records an apparatus for identifying an encrypted data stream. The apparatus includes a parsing module configured to parse a plurality of handshake messages of an encrypted data stream according to a secure encrypted transmission protocol corresponding to the encrypted data stream, to obtain a plurality of fields included in the plurality of handshake messages, a matching module configured to determine, from a plurality of rule sets and based on the plurality of fields, a rule set that matches the plurality of handshake messages, where each of the plurality of rule sets includes at least one of a field rule or an order rule, the field rule is used to indicate a feature of a field, the order rule is used to indicate an order of a plurality of fields in a handshake message, and the fields in the plurality of handshake messages meet a rule in the matched rule set, and a determining module configured to determine, based on a mapping relationship between the matched rule set and an application, an application corresponding to the encrypted data stream.

The fields in the plurality of handshake messages in the encrypted data stream are parsed, and the fields are matched with the plurality of rule sets, to find the rule set corresponding to the plurality of packets, and then, an application in a mapping relationship with the rule set is determined using the rule set. In this way, identification no longer relies on domain name information that is easily tampered with or inaccurate in the handshake message, applications corresponding to more encrypted data streams can be identified, and accuracy of identifying the encrypted data stream can be improved.

In an implementation, the apparatus for identifying an encrypted data stream stores the plurality of rule sets and a mapping relationship between a rule set and an application.

Because the third aspect provides an apparatus corresponding to the first aspect, for term explanations, implementations, and technical effects of the third aspect, refer to descriptions in the first aspect. Details are not described again in this application.

According to a fourth aspect, this application records an apparatus for identifying an encrypted data stream. The apparatus includes a parsing module configured to parse one handshake message of an encrypted data stream according to a secure encrypted transmission protocol corresponding to the encrypted data stream, to obtain a plurality of fields included in the handshake message, a matching module configured to determine, from a plurality of rule sets and based on the plurality of fields, a rule set that matches the handshake message, where each of the plurality of rule sets includes at least one of a field rule or an order rule, the field rule is used to indicate a feature of a field, the order rule is used to indicate an order of a plurality of fields in a packet, and the fields in the handshake message meet a rule in the matched rule set, and a determining module configured to determine, based on a mapping relationship between the matched rule set and an application, an application corresponding to the encrypted data stream.

In an implementation, the apparatus for identifying an encrypted data stream stores the plurality of rule sets and a mapping relationship between a rule set and an application.

Because the fourth aspect provides an apparatus corresponding to the second aspect, for term explanations, implementations, and technical effects of the fourth aspect, refer to descriptions in the second aspect. Details are not described again in this application.

According to a fifth aspect, this application records a device for identifying an encrypted data stream. The device includes a processing circuit, an interface circuit, and a storage medium, the interface circuit is configured to receive a packet from and transmit a packet to another device using an instruction in the storage medium, and the processing circuit is configured to run the instruction in the storage medium to control the interface circuit, to implement the method according to the first aspect and the implementations of the first aspect.

Because the fifth aspect provides a device corresponding to the first aspect, for term explanations, implementations, and technical effects of the fifth aspect, refer to descriptions in the first aspect. Details are not described again in this application. In an implementation, the apparatus described in the third aspect runs on the device in the fifth aspect.

According to a sixth aspect, this application records another device for identifying an encrypted data stream. The device includes a processing circuit, an interface circuit, and a storage medium, the interface circuit is configured to receive a packet from and transmit a packet to another device using an instruction in the storage medium, and the processing circuit is configured to run the instruction in the storage medium to control the interface circuit, to implement the method according to the second aspect and the implementations of the second aspect.

Because the sixth aspect provides a device corresponding to the second aspect, for term explanations, implementations, and technical effects of the sixth aspect, refer to descriptions in the second aspect. Details are not described again in this application. In an implementation, the apparatus described in the fourth aspect runs on the device in the sixth aspect.

Another aspect of this application provides a computer readable storage medium. The computer readable storage medium stores an instruction, and when the instruction is run on a computer, the computer performs the methods in the foregoing aspects.

Still another aspect of this application provides a computer program product that includes an instruction. When the instruction is run on a computer, the computer performs the methods in the foregoing aspects.

For detailed descriptions of term explanations, implementations, and technical effects of the foregoing two aspects, refer to related descriptions of technical effects of the corresponding aspects. Details are not described herein again.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DESCRIPTION OF EMBODIMENTS

Figure 1:
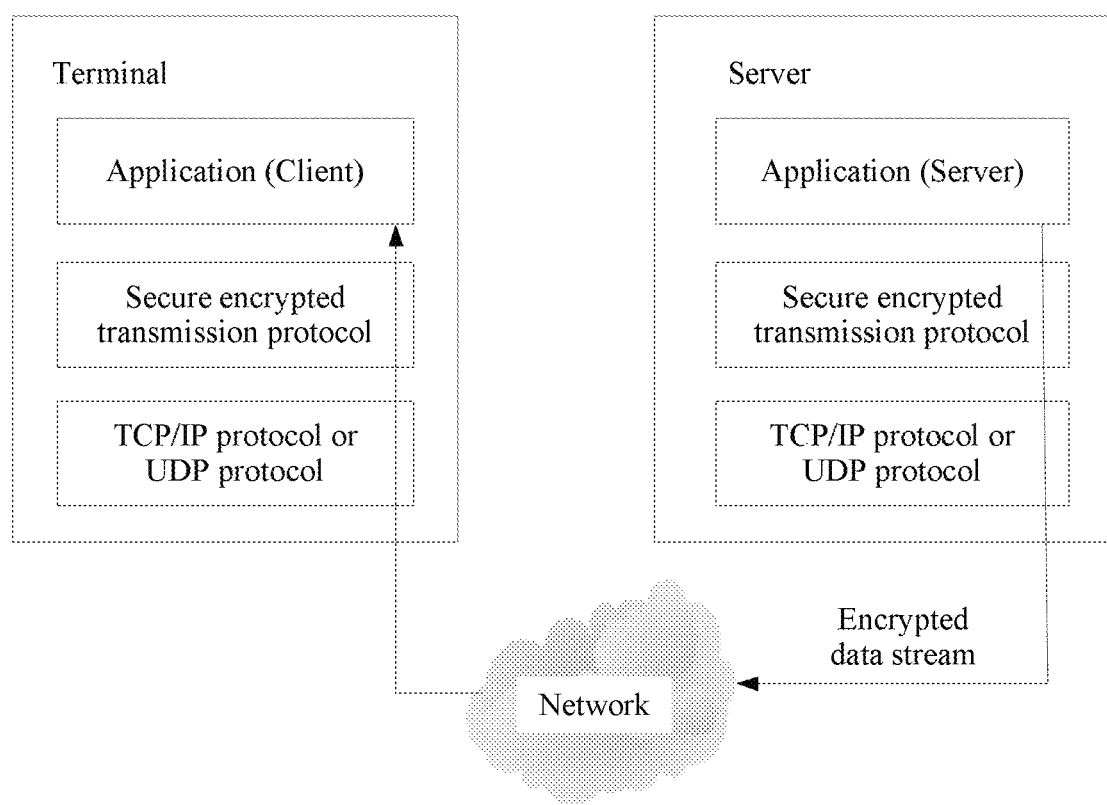
FIG. 1 is a schematic diagram of transmission of a data stream according to this application.

The character "/" in this specification generally indicates an "or" relationship between the associated objects. For example, A/B may be understood as A or B.

In the specification and claims of the present disclosure, the terms "first", "second", "third", "fourth", and so on are intended to distinguish between different objects but do not indicate a particular order of the objects.

In descriptions of the present disclosure, "plurality of" means two or more unless otherwise stated.

In addition, the terms "including", "having", or any other variants thereof mentioned in descriptions of the present disclosure, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In the following descriptions, specific details such as a particular system architecture, an apparatus architecture, and a technology are provided in an illustrative but not a restrictive sense to make a thorough understanding of the present disclosure. However, a person skilled in the art should know that the present disclosure may be practiced in other embodiments without these specific details. In other cases, detailed descriptions of well-known apparatuses, circuits, and methods are omitted such that the present disclosure is described without being obscured by unnecessary details.

The following describes the technical solutions in the embodiments of the present disclosure in detail with reference to the accompanying drawings in the embodiments of the present disclosure.

To facilitate a clearer understanding of implementations of the embodiments of the present disclosure, the following first defines/explains technical terms used in the embodiments of the present disclosure.

Secure encrypted transmission protocol is the SSL protocol, the TLS protocol, the DTLS protocol, or another secure encrypted transmission protocol that runs below an application layer mentioned in the background. Because of evolution of technologies, each secure encrypted transmission protocol may have a plurality of versions.

Handshake message (or called "handshake packet") is a message used for establishing a connection between a server end and a client using a secure encrypted transmission protocol. A handshake message occurs in a handshaking phase of a connection of TLS, SSL, DTLS, or the like. There are descriptions of the handshaking phase and the handshake message in various versions of TLS, SSL, and DTLS (for example, TLS 1.0 to TLS 1.3, SSL 1.0 to SSL 3.0, and DTLS 1.0 to DTLS 1.3). For details, refer to, for example, request for comments (RFC) 5246, RFC 6176, RFC 6083, and RFC 6347. For example, all the following messages are handshake messages Client Hello, Hello Verify Request, Server Hello, Certificate, Server Key Exchange, Server Hello Done, Client Key Exchange, Hello Request, Change Cipher Spec, Encrypted Handshake Message, New Session Ticket, Alert, Finished, Certificate Status, Certificate Verify, and Certificate Request.

It should be understood that, in some cases, because of a limitation of a network environment or a communication protocol, information about one handshake message may be carried by a plurality of packets or messages. In an embodiment, after being parsed, the plurality of packets or messages may jointly form information included in a complete handshake message. It should be understood that a name of the handshake message or a name of the message in this application is a value that is of a handshake type field and that is obtained by parsing the handshake message using a corresponding secure encrypted transmission protocol, or content recorded after a colon in a line "Handshake Protocol:" after the handshake message is parsed, for example, in "Handshake Protocol: Client Hello", Client Hello is the name of the handshake message, or a value of a field used to represent a same meaning in an encryption protocol of another version. For example, Client Hello, Certificate, and Server Key Exchange are names of handshake messages.

A message is sometimes translated as a packet, for example, a data packet is also a message. In this application, an encrypted data stream between a client and a server includes a plurality of messages. In this application, identifying an application corresponding to an encrypted data stream is actually implemented by identifying an application corresponding to a handshake message in the encrypted data stream.

Data stream is a set of ordered bytes that have a start point and an end point.

The SSL protocol, the TLS protocol, and the DTLS protocol are all currently widely used secure encrypted transmission protocols. The TLS protocol is an upgraded version of the SSL protocol, and both are used to protect data of a Transmission Control Protocol (TCP) connection, and therefore SSL and TLS are sometimes used together in the industry. The DTLS protocol is based on the TLS protocol, and is used to protect data of a UDP connection. For example, statistics from some research institutes outside China show that nearly 60% of network traffic has been encrypted and protected using SSL/TLS. The foregoing secure encrypted transmission protocols are used to ensure security of data transmission, and a data encryption technology is used to ensure that data is not intercepted or eavesdropped during transmission in a network.

Data of various applications may be transmitted in the network using the foregoing secure encrypted transmission protocols. The technical solutions described in this application are used to identify an application corresponding to a data stream that uses the foregoing secure encrypted transmission protocols (an encrypted stream or a data stream for short below).

A transmit end and a receive end of the encrypted stream may be described using a client/server (C/S) software system architecture, and one encrypted stream is transmitted between a client and a server of one application. In such an architecture, both the client and the server are applications. Further, an application used as the client requests a service, and an application used as the server provides a service for the application used as the client. The client and the server of the encrypted stream that are described in this application are applications of a same type. In this way, a plurality of applications may be deployed on a same physical device or different physical devices, and an advantage of a hardware environment in which the client and the server are located is fully used. In other words, the method for identifying an encrypted data stream described in this application does not limit a type of a device on which the client and the server of the data stream are located. For example, the device may be a terminal, or may be a server, or may be a cloud platform. In other words, the data stream may be transmitted between a terminal and a cloud, or may be transmitted between clouds or terminals, or the like. The SSL/TLS protocol is located between the TCP/Internet Protocol (IP) protocol and various application layer protocols, and provides security support for data communication. Application data needs to be first processed at an SSL layer, and then can be sent through a TCP/IP layer. In other words, before a TLS connection is established between the client and the server, a TCP connection needs to be established first. The DTLS protocol is located between the UDP protocol and various application layer protocols. For example, a data stream is transmitted between a terminal and a server. FIG. 1 is a schematic diagram of transmission of the data stream. An application is deployed at an application layer, and there may be a monitoring device between the terminal and the server. In addition, because data is encrypted, information that can be used to identify an encrypted data stream is very limited. In some embodiments of this application, information in a handshake message is used to identify an encrypted stream. In a scenario of this application, the client and the server are a same version of a same application, and in another scenario, the client and the server are different versions of a same application.

Figure 2:
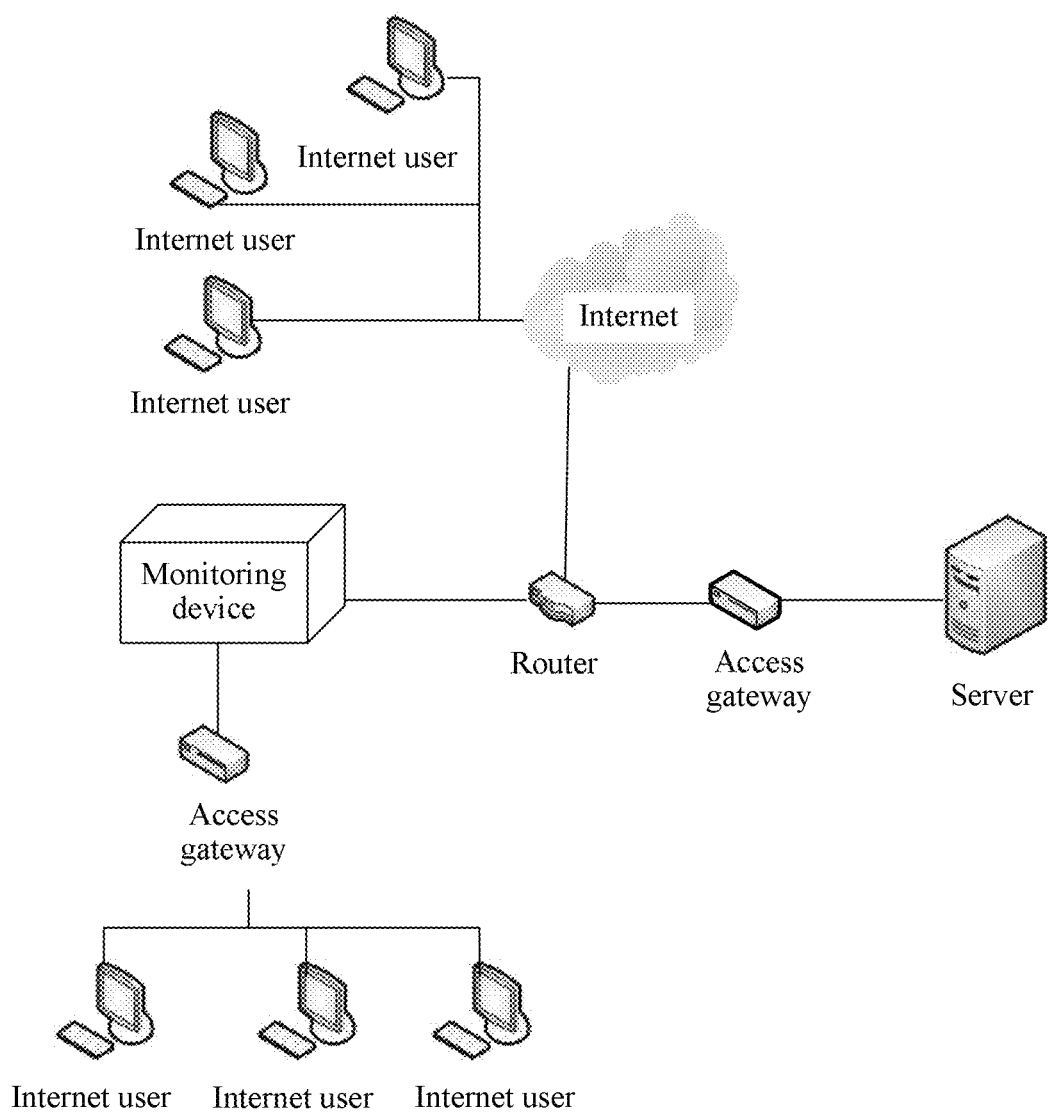
FIG. 2 is a diagram of a network architecture according to this application.

In another aspect, the method in this application may be applied to a monitoring device in a network, and the monitoring device is used to identify traffic. A specific networking manner of the network is not limited in this application. For example, the monitoring device may be disposed, as shown in FIG. 2, on a link that needs to be detected, for example, a gateway, or may bypass a link that needs to be detected, for example, a bypass analysis device having a traffic identification function. For example, if software having the traffic identification function runs on a server, the server may be considered as a monitoring device. In an embodiment, a data stream that is transmitted from a node and that needs to be identified is copied from the node on the link that needs to be detected, and is input to the monitoring device. For example, FIG. 2 is an architectural diagram of a network that can use the method in this application. A terminal used by an Internet user connects to an access gateway using a local network. The access gateway sends data of the user to a router in a backbone network. The backbone network is a high-speed network for connecting a plurality of regions or areas. Each backbone network includes at least one node that interconnects and interworks with another backbone network. For example, different network providers have respective backbone networks, to connect their networks in different regions. Various servers on the Internet also connect to the router in the backbone network using the access gateway. There are a plurality of hops of routers between the Internet user and access gateways corresponding to the server, and a traffic monitoring device may be added between each of these access gateways and the router. In this way, the traffic monitoring device can analyze a received message, to obtain an identification result.

Figure 3:
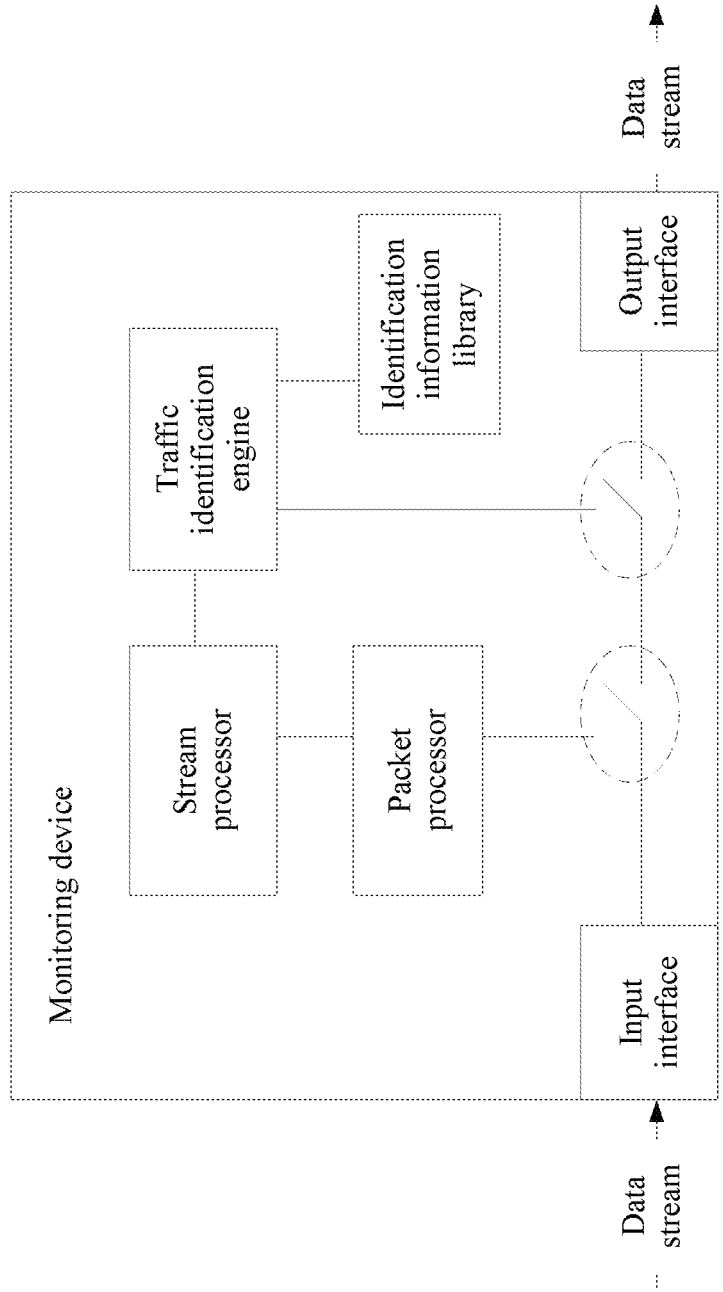
FIG. 3 is an architectural diagram of a monitoring device according to this application.

An architecture of the monitoring device in an implementation is described below with reference to FIG. 3. The monitoring device is a device to perform the method for identifying an encrypted stream described in this application, namely, a device for identifying an encrypted stream, and a software part of the monitoring device may be considered as an implementation of an apparatus (for example, FIG. 7) for identifying an encrypted stream recorded in this application. The monitoring device includes an input interface and an output interface. A data stream in a network may flow into the monitoring device through the input interface, and then flow out through the output interface. In FIG. 3, for ease of understanding, the input interface and the output interface are separate, but the input interface and the output interface may be a same interface in an actual device, for example, an input/output (I/O) device, and the input interface and the output interface may be antennas, interface circuits, or the like. The monitoring device may analyze a data stream (actually, a plurality of messages) that flows through the input interface, or may copy or mirror a data stream that flows through the input interface, and the data stream that flows through the input interface flows out through the output interface. For example, an apparatus illustrated as a plurality of switches in two dashed ellipses in FIG. 3 represents a unit for traffic control. When two switches are in vertical positions, FIG. 3 shows that a data stream that flows through the input interface is identified using a module such as the following packet processor. When two switches are in horizontal positions, FIG. 3 shows that a data stream that flows through the input interface is not analyzed, and directly flows out through the output interface, and in this case, FIG. 3 does not show that a mirrored data stream is analyzed using the following module.

The following briefly describes a main step in a data stream analysis process in an implementation with reference to FIG. 3. A packet processor parses a message in a data stream, where the packet processor parses the message using a TCP/IP protocol stack or a UDP protocol stack, to obtain a field in the message. Some messages in the data stream may be parsed, and some fields in the message may be parsed. A stream processor determines a data stream to which the parsed message belongs, that is, determines parsed messages that belong to a same data stream. For example, the parsed messages that belong to a same data stream may be determined using a 5-tuple (including a source IP address, a destination IP address, and a port number) in the parsed message, for example, an identifier of a same stream is allocated to messages that have a same 5-tuple. The monitoring device may record, using a hash table, which parsed messages belong to a same stream. A traffic identification engine parses the parsed message in one stream, that is, analyzes one or more messages of one stream, including matching the one or more messages using a rule set used for identifying an encrypted data stream, to determine a rule set that matches the one or more messages, and determining, based on the rule set and a mapping relationship between a rule set and an application, an application corresponding to the stream.

The rule set is a set of rules, and the identification information library is used to store the plurality of rule sets and the mapping relationship between a rule set and an application. The packet processor, the stream processor, the traffic identification engine, and the identification information library described above are all software modules. In this specification, for ease of understanding, such division is performed from a functional perspective, but in actual implementation, a division manner of software modules in the monitoring device is not limited provided that the method described in this application can be implemented. Certainly, in an implementation, the monitoring device may cooperate with another device to complete the foregoing functions. For example, the foregoing packet processor, stream processor, traffic identification engine, and identification information library may be cloudified. Alternatively, the foregoing packet processor, stream processor, traffic identification engine, and identification information library are distributed on a plurality of nodes. In this case, it may also be considered that a series of modules that implement the foregoing functions constitute a monitoring system to implement the foregoing monitoring function, or the entire monitoring system may be considered as a cloudified or distributed monitoring device. In other words, the monitoring device in this specification is not limited to a single physical node. For example, the identification information library that stores the plurality of rule sets and the mapping relationship between a rule set and an application may be stored on another server or storage node, and only a part of information in the identification information library is loaded to the monitoring device, or the monitoring device even does not store information in the identification information library. The monitoring device uses the identification information library by communicating with another server or storage node.

A connection using the TLS protocol is referred to as a TLS connection, and a connection using the DTLS protocol is referred to as a DTLS connection.

Before data is transmitted on each TLS connection or DTLS connection, a handshake message needs to be transmitted between a client and a server to establish a connection. Data is transmitted between the client and the server only after handshaking is completed.

A handshaking procedure between the client and the server when the SSL/TLS protocol is used to transmit data is described below using an example. For a handshaking procedure of the DTLS protocol, refer to related content in the standard RFC 6347. Details are not described in this application.

Figure 4A:
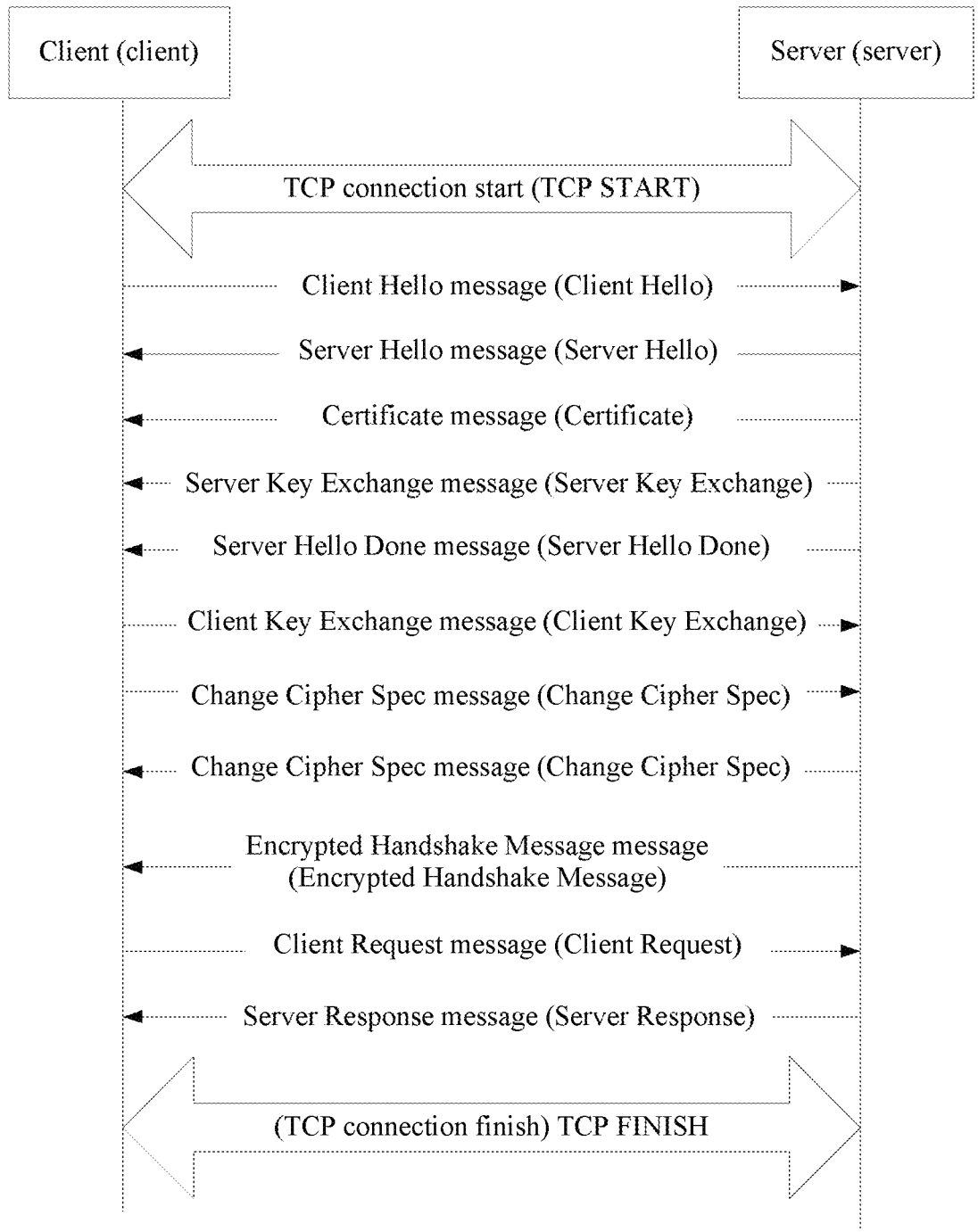
FIG. 4A is a schematic diagram of a handshaking procedure of a TLS stream according to this application.
Figure 4B:
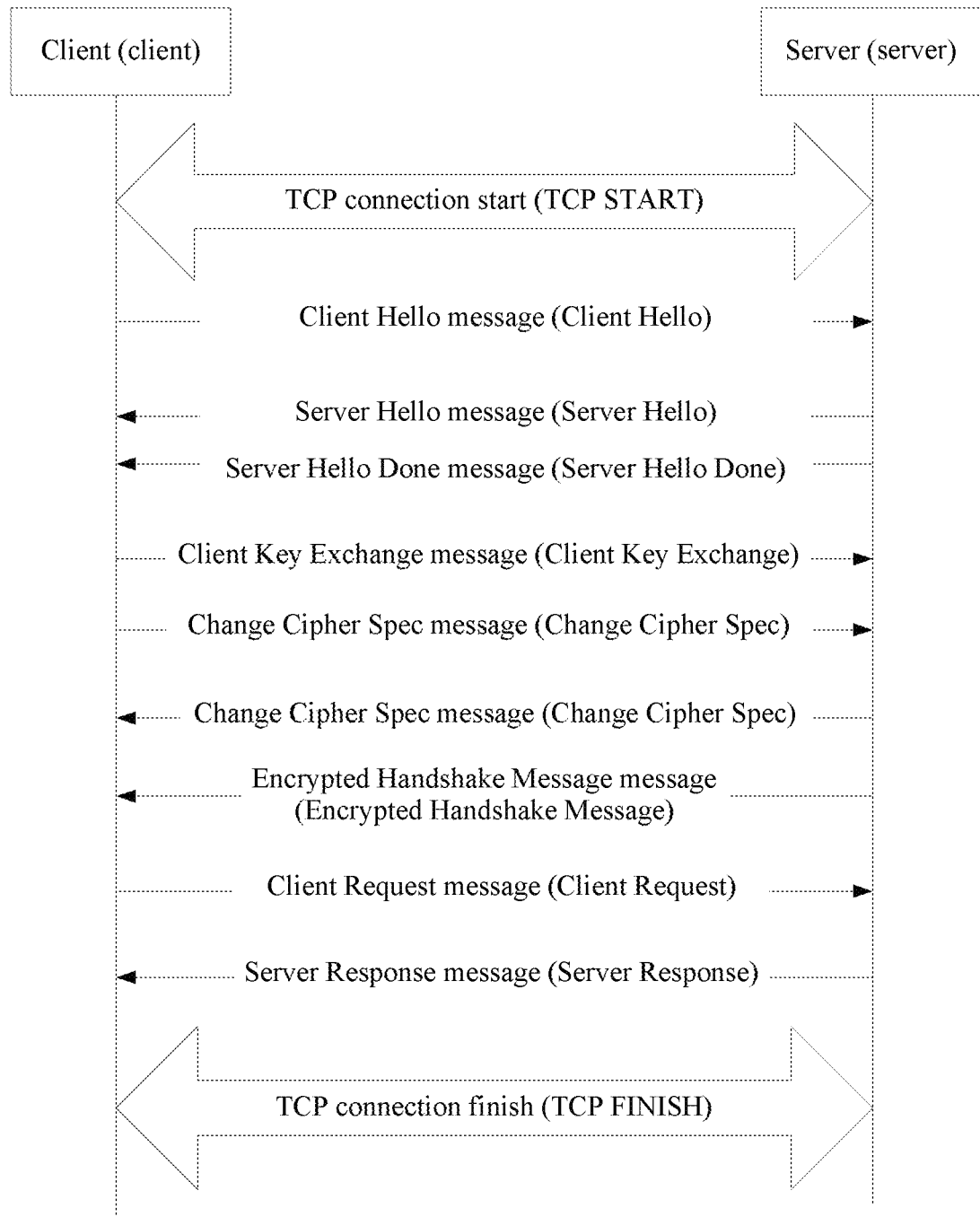
FIG. 4B is a schematic diagram of another handshaking procedure of a TLS stream according to this application.

It should be understood that the TLS protocol has a plurality of versions, and is also applicable to a plurality of scenarios. For further details, refer to related paragraphs in different versions of the TLS protocol. For example, FIG. 4A shows an example in an Elliptic Curve Diffie-Hellman-Elliptic Curve Digital Signature Algorithm (ECDHE-ECDSA) scenario in TLS 1.2, and ECDHE-ECDSA represents a TLS handshaking procedure when a server and a client are connected for the first time. FIG. 4B shows an example in a Public Safety Interoperable Communications (PSIC) scenario in TLS 1.2, and PSIC represents a TLS handshaking procedure when a server and a client are not connected for the first time (for example, are disconnected after being connected, or negotiate a new connection before a previous connection is disconnected). It can be learned that there are different TLS handshaking procedures in different scenarios.

In FIG. 4A, the client and the server exchange handshake messages in a time sequence, including the following.

The client sends a Client Hello message to the server, where the message may be used to notify the server of an encryption algorithm supported by the client.

The server returns a Server Hello message, a Certificate message, a Server Key Exchange message, and a Server Hello Done message to the client. The Server Hello message may be used to notify the client of an encryption algorithm used in this handshaking. The Certificate message may indicate validity and authenticity of an identity of the server to the client, for example, indicate that the server is not a fake server. The Server Key Exchange message may be used to send a key to the client for key negotiation. The Server Hello Done message may be used to notify the client that this group of messages of the server are all sent, and the client may send a subsequent message.

After receiving these messages, the client sends a Client Key Exchange message and a Change Cipher Spec message to the server. After receiving the two messages, the server sends a Change Cipher Spec message and an Encrypted Handshake Message to the client. Client Key Exchange, Change Cipher Spec, and Change Cipher Spec may be used by the client and the server to negotiate on a key used in a subsequent data transmission process. The Encrypted Handshake Message sent by the server may be used to notify the client that the handshaking procedure ends.

The handshaking procedure in the PSIC scenario described in FIG. 4B is relatively simple. The client sends a Client Hello message to the server, where the message may be used to notify the server of an encryption algorithm supported by the client.

The server returns a Server Hello message and a Server Hello Done message to the client. The Server Hello message may be used to notify the client of an encryption algorithm used in this handshaking.

After receiving these messages, the client sends a Client Key Exchange message and a Change Cipher Spec message to the server. After receiving the two messages, the server sends a Change Cipher Spec message and an Encrypted Handshake Message to the client. Client Key Exchange, Change Cipher Spec, and Change Cipher Spec may be used by the client and the server to negotiate on a key used in a subsequent data transmission process. The Encrypted Handshake Message sent by the server may be used to notify the client that the handshaking procedure ends.

After the client parses information about the two messages, the handshaking procedure between the client and the server ends. Then, the client and the server may exchange data, and the data is transmitted in a network in a manner of a TLS stream. From the perspective of instruction exchange, FIG. 4A and FIG. 4B each illustrate an implementation. In an embodiment, the client sends a Client Request to request the server to send data, and the server sends a server response (translated as a Server Response message in both FIG. 4A and FIG. 4B) to send the data to the client. It can be learned that a handshake message of the TLS stream may indicate the TLS stream.

Before the foregoing TLS handshake message exchange process, the client and the server need to complete three handshaking procedures at a TCP layer. In FIG. 4A and FIG. 4B, TCP START is used as an example. After TLS data exchange in this connection is completed between the client and the server, the TCP connection on which the TLS connection relies may be disconnected. In FIG. 4A and FIG. 4B, TCP FINISH is used as an example.

The message used to identify the encrypted data stream described in this application is from a handshaking phase. It can be learned that different handshake messages are included in handshaking phases in different scenarios. For example, in the TLS 1.2 protocol, most handshake messages in the foregoing handshaking phase are plaintext (in other words, after obtaining the handshake message, the monitoring device may obtain information about most fields through parsing), while in the TLS 1.3 protocol, only a Client Hello message and a Server Hello message are plaintext in the handshaking phase.

For example, in other approaches, a domain name of a TLS stream is determined using an SNI field or a common name field in a handshake message of the TLS stream, to identify an application corresponding to the TLS stream. Apparently, this is because these fields carry a domain name (Host name). Because the domain name carries information about a server that sends data of the stream, a part of the domain name may indicate the application. For example, if the domain name is books.google.com, it may be learned that the application is a book application of GOOGLE, or if the domain name is mail.google.com, it may be learned that the application is a GMAIL application of GOOGLE. In other words, the two fields carry application-related information, and in other approaches, a meaning of a value (domain name) of a field is parsed to indicate an application.

However, for the following reasons, very limited data streams can be identified in other approaches, and identification accuracy is also low.

1. Domain name information in the foregoing fields is erroneous in many cases, for example, an erroneous SNI is deliberately set in a fraud application, a virtual private network (VPN) application, and a virus application, to evade application identification.

2. More domain names no longer carry information about an application corresponding to an encrypted stream, or the domain name is insufficient to determine an application. For example, a domain name in a common name is not an exact domain name, and in most cases is a domain with a wildcard character "*". This can ensure that one certificate supports a series of domain names at the same time, but also causes difficulty to application identification. The two applications of GOOGLE mentioned above are used as an example. A common name field in a Certificate message sent by a server of GOOGLE is usually set to *.google.com. In this case, an application of GOOGLE to which this stream belongs cannot be determined based on the common name field.

3. A large amount of transmitted data (such as pictures and videos) is stored on a cloud platform (such as AMAZON S3), and in this case, a domain name can indicate only information about the cloud platform. For example, a domain name is a248e.akamai.net or s3.amazon.com. Different data is distinguished using a specific path after the domain name. For example, an application A and an application B each have deployed respective image content at s3.amazon.com, but both SNIs used by traffic generated when a user accesses the application A and the application B using Hypertext Transfer Protocol Secure (HTTPS) are s3.amazon.com. In this case, there is no way to distinguish between the application A and the application B using this technology.

4. In addition, an SNI field or a common name field is probably not carried in a message or cannot be parsed, and in this case, an application corresponding to an encrypted data stream cannot be identified using a domain name. The SNI field is an optional field of the Client Hello message. For example, usually no SNI field is set in a communication scenario such as transmitting an FTP or a mail using a secure encrypted transmission protocol. In many cases, there is no SNI even in an HTTPS scenario in which Hypertext Transfer Protocol (HTTP) content is transmitted using a secure encrypted transmission protocol. For example, there is no SNI field in HTTPS communication traffic of an IE 6 browser that is a built-in browser of WINDOWS XP. As shown in FIG. 4A and FIG. 4B, the Certificate message does not appear in each TLS stream. A handshake resumption mechanism exists in TLS. During handshake resumption, no certificate needs to be transmitted, and information about previous handshaking is directly used. In the next-generation TLS standard TLS 1.3, an encryption mechanism of the TLS protocol is adjusted, and all messages after the Client Hello message and the Server Hello message are transmitted in an encrypted manner. The Certificate handshake message is transmitted in an encrypted manner, and a gateway or a monitoring device used as a network device cannot obtain, through parsing, a domain name carried in a common name field in the handshake message.

The foregoing disadvantages are all caused by other approaches, in which identification of an encrypted stream relies only on an SNI field or a common name field, but fields such as the SNI field and the common name field may be not set, may be set erroneously, or may be set to a fuzzy value, causing identification to be failed or erroneous. However, in this application, an encrypted stream is identified using another field instead of relying on the SNI field or the common name field, and the other field does not carry information that can indicate an application. Therefore, the solution in this application does not rely on a meaning of a value of a field, but rule sets are matched and a mapping relationship between a rule set and an application is used such that applications corresponding to more data streams can be identified, and identification accuracy is greatly improved.

Actually, in this application, a handshake message used to identify an encrypted data stream may be at least one of the following messages Client Hello, Hello Verify Request, Server Hello, Certificate, Server Key Exchange, Server Hello Done, Client Key Exchange, Hello Request, Change Cipher Spec, Encrypted Handshake Message, New Session Ticket, Alert, Finished, Certificate Status, Certificate Verify, and Certificate Request. In other words, an encrypted stream corresponding to the handshake message is identified by detecting whether fields in the foregoing one or more handshake messages match various rules described below for identifying an encrypted data stream.

The secure encrypted transmission protocol is a protocol in a Type Length Value (TLV) format. Therefore, after a handshake message is parsed, a field in the handshake message usually includes three parts type, length, and value. Each or any combination of the three parts may be referred to as a feature of the field.

The type may have different levels. For example, for an extension field extension ec_point_formats (len=2), extension is a type, and ec_point_formats is also a type. A type of a field is usually used to indicate the field, for example, extension ec_point_formats (len=2) is referred to as an extension field, or is more specifically referred to as an ec_point_formats field in an extension field. Certainly, in an actual message, some of three parts of some fields may be default. The network device may obtain, through parsing, specific content of a type, a length, and a value of an unencrypted field in a received message. For example, in the Client Hello message, 11 is used to indicate a type of an extension field, and it may be learned through table lookup that 11 represents ec_point_formats. When a field rule is being matched, if the field rule includes a limitation on the three parts, and in a matched message, one or more parts of the field are default, the default part may meet the corresponding rule by default. The foregoing default case may be that a field misses a part as defined in a protocol, or may be that some parts are fixed values in a protocol and therefore are not carried in a message. For example, in the Certificate message, an id-at-countryName=US field includes content of only two parts a type (id-at-countryName) and a value (US). For an algorithm (rsaEncryption) field, because the TLS protocol specifies that this type field appears at a fixed location and a field length is fixed, the field carries only a field value (rsaEncryption).

In addition, fields of a handshake message may be nested, and is embodied as nested use of a TLV format. For example, a type of an extension field in the Client Hello message is ec_point_formats (11), where 11 is a numeral used to indicate a type of the field in an unparsed message, ec_point_formats is a specific type obtained through parsing, a length of the field is 2, and values of the field are Elliptic curve (EC) point formats Length: 1 and EC point formats (1), where the EC point formats (1) is a type in a TLV format of a next-level field, and the EC point formats Length: 1 is a length in the TLV format of the next-level field. The foregoing information may be recorded in the parsed field in the following manner:

⊿ Extension: ec_point_formats (len=2)
   Type: ec_point_formats (11)
   Length: 2
   EC point formats Length: 1
▷ Elliptic curves point formats (1).

Where ⊿ indicates that content of the extension field is expanded, and ▷ indicates that there is still other unexpanded content below the EC point formats (1) field.

Figure 5A:
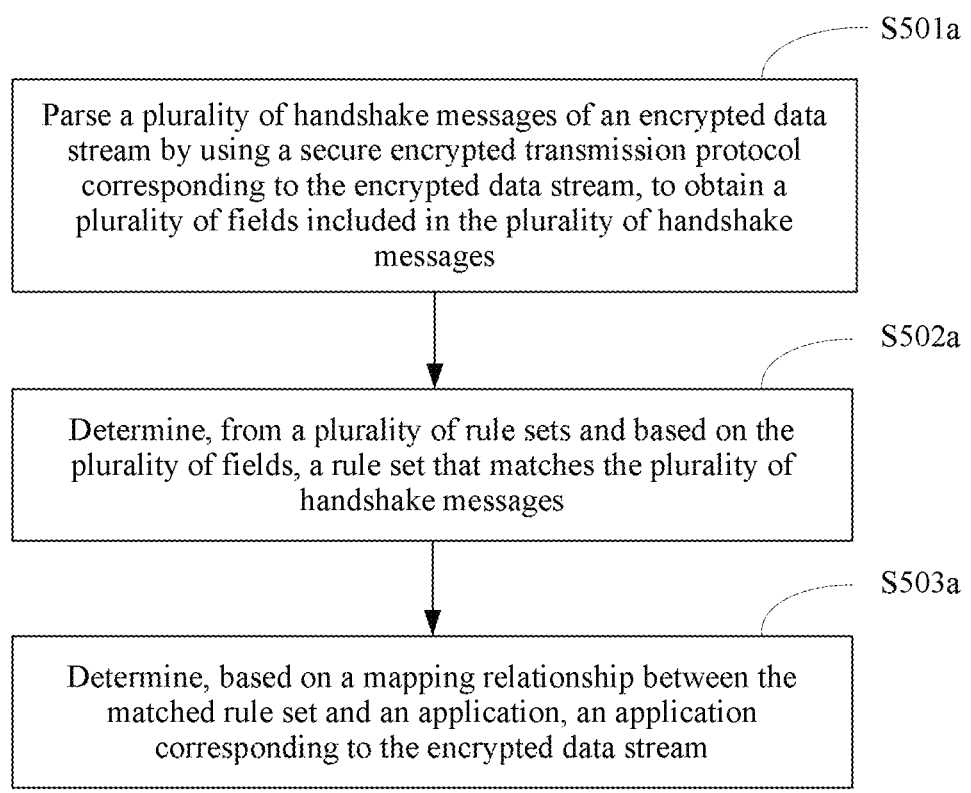
FIG. 5A is a schematic diagram of a method for identifying an encrypted stream according to this application.
Figure 5B:
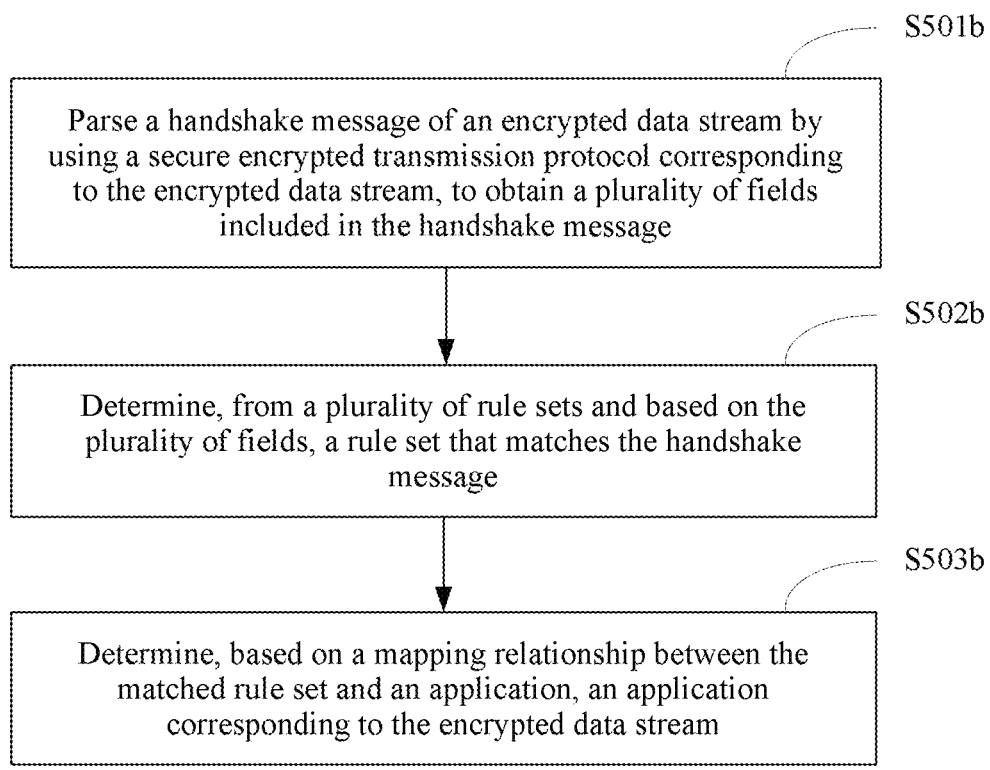
FIG. 5B is a schematic diagram of another method for identifying an encrypted stream according to this application.

FIG. 5A and FIG. 5B each describe a method for identifying an encrypted data stream. In the method in FIG. 5A, an encrypted data stream is identified using a plurality of handshake messages of the encrypted data stream. In the method in FIG. 5B, an encrypted data stream is identified using one handshake message of the encrypted data stream. FIG. 5A includes steps S501a, S502a, and S503a. FIG. 5B includes steps S501b, S502b, and S503b. It should be understood that a sequence number and a connection relationship between steps in the figures do not limit an execution sequence of the steps. Specific implementations of the method in FIG. 5A and the method in FIG. 5B are not limited in this application.

For example, S501a and S502a in FIG. 5A are performed repeatedly in cycles in some implementations. Such repeated cyclic execution also has a plurality of implementations. Examples are provided in this application merely for description, and are not listed one by one. In an implementation, one message may be parsed, and a plurality of matched rule sets are determined from a plurality of rule sets based on a field in the message, then another message is parsed, and a plurality of matched rule sets are determined from the plurality of rule sets, and then an intersection set is obtained. If the intersection set is not a unique rule set, a message continues to be parsed and matched, until a rule set that matches the plurality of messages is obtained.

In an implementation, one message may be parsed, and a plurality of matched rule sets are determined from a plurality of rule sets based on a field in the message, then another message is parsed, and a rule set that matches the two messages is determined from the plurality of matched rule sets, and if the rule set that matches the two messages is not a unique rule set, a message continues to be parsed, and is matched with the rule set that matches the two messages, until a rule set that matches the plurality of messages is obtained. Certainly, optionally, determining may be performed in one time of matching, and if another message of the stream does not meet a rule in a matched rule set, the matched rule set is discarded, and re-matching is performed in the plurality of rule sets, or re-matching is performed in a previously matched rule set.

For another example, in an implementation, some fields in the plurality of messages may be parsed, and the fields are matched with the plurality of rule sets, to obtain a rule set that matches the fields, then the other fields in the plurality of messages are parsed, and the other fields are matched with the obtained matched rule set.

For another example, in an implementation, a type of a field in the message may be first parsed, to match an order rule (the order rule may exist or may not exist) in a rule set based on types of a plurality of fields and an order of the types, and then another feature of the field in the message is parsed, to match a field rule in the rule set. Certainly, this implementation is more applicable to a case in which the plurality of rule sets include an order rule.

For another example, S502a and S503a in FIG. 5A may be first matching one message to obtain a rule set corresponding to the message and a rule subset, met by the message, in the rule set corresponding to the message, obtaining, based on a matching relationship between the met rule subset and an application, an application set corresponding to the message, matching another message of the encrypted data stream, and continuously narrowing down the application set or solving for an intersection set of several obtained application sets (this is not specifically limited), to finally obtain an application that matches the encrypted data stream.

For another example, steps S501a, S502a, and S503a in FIG. 5A may be performed in parallel on the plurality of messages. In an embodiment, when S501a is performed on a message, S502a may be performed on another message, and S503a may be performed on still another message. In an implementation, one of the plurality of messages in the encrypted data stream may be parsed, and at least one rule set that matches the message is determined from the plurality of rule sets based on a field in the message, to obtain an application set corresponding to each rule subset, met by the message, in the at least one matched rule set.

Similarly, for example, S501b and S502b in FIG. 5B are performed repeatedly in cycles in some implementations. Such repeated cyclic execution also has a plurality of implementations. Examples are provided in this application merely for description, and are not listed one by one.

For example, in an implementation, each time one field is parsed, the field may be matched with field rules in a plurality of rule sets, and then based on fields related to remaining rules in a rule set that matches the parsed field, a corresponding field is parsed.

For another example, in an implementation, one handshake message may be parsed in segments. Each time several fields of a segment are parsed, the several fields are matched with rules in the plurality of rule sets to obtain at least one rule set that matches the several fields, and then fields of another segment are parsed and matched, to obtain a rule set that matches the message.

For the methods in FIG. 5A and FIG. 5B, some implementations thereof are described in summary of this application, and an implementation is also described below using a TLS stream as an example. From these implementations, a person skilled in the art may learn a corresponding implementation of identifying an encrypted stream of another secure encrypted transmission protocol, and therefore, details are not described in this application.

The foregoing implementations may be used in different scenarios, such as identifying an application corresponding to an encrypted stream in a network, or identifying, from a data stream transmitted in a network, an encrypted stream that corresponds to an application. In different scenarios, implementations with a relatively fast matching speed may be different.

Terms and some specific implementations that appear in the figures and the foregoing implementations are described below. It should be understood that, a plurality of implementations for processing a handshake message are described in this application, and may be applicable to identification using a plurality of handshake messages, or may be applicable to identification using one handshake message. Details are not separately described in this specification.

A person skilled in the art should understand that, in this application, when fields of a message are obtained through parsing using a secure encrypted transmission protocol, not only features of these fields can be obtained through parsing, but also an order of these fields can be obtained through parsing.

It should be noted that, as described above, determining, from the plurality of rule sets and based on the plurality of fields, a rule set that matches a plurality of messages or one message means that the plurality of messages or the one message matches one rule set, and the matched rule set is the same as a rule set in the plurality of rule sets. In an embodiment, the matching not only constrains that the plurality of messages or the one message matches several rules, but also constrains that a combination of the several rules is one of the plurality of rule sets. Matching of a plurality of messages is used as an example. The plurality of messages match rules numbered 1, 3, 5, 17, 18, 23, and 37. However, the plurality of rule sets include only a rule set such as {1, 5, 18, 23, 37}. In this case, a rule set that matches the plurality of messages is {1, 5, 18, 23, 37} instead of {1, 3, 5, 17, 18, 23, 37}.

A field rule is used to indicate a feature of a field. A feature of a field may be at least one of a type, a length, and a value of the field. For example, the feature may be a length of the field, or a type and a length of the field, or a type, a length, and a value of the field.

A handshake message has a plurality of lengths. In the rule described in this application, the length is considered as an integer, and matching a length of a field is matching a value of the length. For example, after a length of a to-be-matched field is obtained through parsing, a comparison operation is performed between the length of the field and a rule that is used to match the length of the field. If a comparison result is "true (true)", the rule is hit, otherwise, the rule is not met.

The rule that is used to match the length of the field may be represented using "equal to", "not equal to" (for example, "not equal to", "greater than", or "less than"), or a range (for example, represented by an interval or a set). For example, a rule may be that a length of a field in a handshake message is equal to a value, or may be that a length of a field in a handshake message is greater than or equal to a value, or may be that a value of a length of a field in a handshake message is within a range.

In the rule described in this application, a value of a field is considered as a character string, and matching of a value of a field may be string matching or substring matching.

The string matching means that matching succeeds only when all values of the field are consistent with those defined in the rule. There may be a plurality of representations for the string matching. For a nested TLV structure, in an implementation, only values in the same level as a length and a type of the field are matched in the string matching. Extension in the Client Hello message mentioned above is used as an example. In the string matching, a character string including two parts EC point formats Length: 1 and Elliptic curves point formats (1) is matched, and the character string does not include content obtained after Elliptic curves point formats (1) is expanded, for example, EC point formats Length: 1 Elliptic curves point formats (1). In other words, content in other lines obtained after Elliptic curves point formats (1) is expanded is not used as a character string that needs to be matched. In another implementation, for a nested TLV structure, in the string matching, not only values in the same level as a length and a type of the field need to be matched, but an unexpanded field nested in the value also needs to be matched. Extension in the Client Hello message mentioned above is used as an example. In the string matching, a character string including EC point formats Length: 1, Elliptic curves point formats (1), and content obtained after Elliptic curves point formats (1) is expanded is matched.

A subsequence of contiguous characters within a character string is referred to as a substring of the string. In the substring matching, a value of a field needs to include only a substring that matches a value indicated in a field rule. For example, a value of a field has a plurality of lines, and it may be that one or more lines match a rule, or a substring in a line matches a rule, or a substring of cross-line characters matches a rule. This is not limited in this application.

A rule that is referred to as an order rule is further described in this application. An order rule is used to indicate an order of a plurality of fields in a handshake message. In the order rule, a type of a field is used to indicate the field, and a length and a value of the field are not considered. In an embodiment, matching an order rule requires that a packet indicated by the order rule includes a group of fields, and types of the group of fields and an order of the types in the message are the same as those described in the order rule, otherwise, the packet does not match (or is referred to as "miss") the order rule.

In an implementation, the plurality of fields are usually a group of fields that have similarity in a message, for example, a plurality of extension fields in a message. For example, six extension fields in the Client Hello message may be considered as a group of fields, a plurality of cipher suites fields in the Client Hello message may be considered as a group of fields, where the plurality of cipher suites fields store names of a plurality of encryption algorithms, and a plurality of extension fields in the Server Hello message may be considered as a group of fields. For example, five extension fields in a Certificate message including eight extension fields are considered as a group of fields. In other words, an order rule may specify an order of some of the plurality of fields that have similarity in the message. For another example, a plurality of random number sequence (RDNSequence) item fields of a subject type in the Certificate message may also be considered as a group of fields, and a plurality of RDNSequence item fields of an issuer type in the Certificate message may also be considered as a group of fields.

It should be noted that the order rule may be in a plurality of forms, and this is not limited in this application provided that all rules that specify an order of a plurality of fields in a message are order rules. The following are examples of several types of order rules.

1. For a Client Hello message having six extension fields, an order of the six extension) fields is specified. In other words, for a specific quantity of fields in a message, an order of all the fields is specified.

2. For a Certificate message having eight extension fields, types of the first, the third, the fourth, the fifth, and the seventh fields in the eight extension fields in the Certificate message are specified. In other words, types of several fields at specific locations in a type of fields in a message are specified.

3. For a Certificate message having eight extension fields, types of five consecutive fields in the eight extension fields of the Certificate message are specified, but locations of the five extension fields in the eight extension fields are not limited. In other words, types of some fields with fixed relative locations in a type of fields in a message are specified.

4. An order of a plurality of RDNSequence item fields of a subject type in a Certificate message is specified, and a plurality of RDNSequence item fields of an issuer type in the Certificate message are specified.

5. Types of a plurality of cipher suites fields in a Client Hello message and types of a plurality of extension fields are specified.

It should be noted that there may be a wildcard rule in the foregoing rules. For a message with a name corresponding to the wildcard rule, all valid messages with this name meet the wildcard rule. In addition, in a process of matching a field rule, one or more parts of a type, a length, and a value of a field corresponding to the field rule are default in a matched message, and the field rule includes exactly an indication for the default part. Therefore, the default part may meet the corresponding rule by default. The foregoing default case may be that a field misses a part as defined in a protocol, or may be that some parts are fixed values in a protocol, and therefore are not carried in a message.

In an implementation, each of the plurality of rule sets corresponds to one application, and one application may correspond to a plurality of rule sets. In this application, a representation form of a mapping relationship between a rule set and an application is not limited, and the mapping relationship may be maintained using a plurality of data structures, for example, a table. The mapping relationship between a rule set and an application may be presented as mapping between a rule set and an application, or may be presented as a correspondence between several subsets in a rule set and a plurality of application sets. Subsets may be obtained through division based on a name of a message, or may be obtained through division based on a type of a rule, or the like. This is not limited in this application.

The rules mentioned above, and the mapping relationship between a rule set and an application may be preset in a monitoring device as a library (such as the identification information library mentioned above), and is obtained through machine learning. In an implementation, a new mapping relationship between a rule set and an application may alternatively be periodically or aperiodically input from another interface to the monitoring device, or the monitoring device may periodically or aperiodically perform sampling for machine learning, to update the library.

Actually, a rule set corresponding to an application may be obtained through machine learning. For ease of description, the application is referred to as a target application. This machine learning process may be offline. The following briefly describes a process of obtaining a rule set corresponding to the target application using a machine learning algorithm. In this process, a known handshake message (namely, a message transmitted between a client and a server in a handshaking phase) of the target application and a message of another application are used as samples for learning. A C/S model is used in the solutions recorded in this application. In an embodiment, one sample needs to correspond to a unique application. It should be understood that a sample may be obtained in a plurality of manners, and this is not limited in this application. For example, in a test environment, transmission of a data stream between a client and a server of the target application includes, for example, establishing handshake using the target application, and then a packet in the data stream is copied or intercepted for analysis. Certainly, some messages of other applications and a handshake message of the target application need to be jointly used as samples, for example, a positive sample and a negative sample described below, and input to a machine learning platform for training. In an implementation, to enable a learned rule set to more accurately and comprehensively identify a message of the target application, a generation condition of a message transmitted in the test environment may be made closer to that of a message that actually needs to be identified. For example, a packet is generated using a plurality of possible versions of the target application in actual networking, the target application runs in an operating system in which the application may run in actual networking, to collect a sample, or a sample is sent or received using a local area network of a country or a region in which the target application may be located in actual networking.

For another example, in an actual networking environment, a plurality of messages are intercepted or copied, a handshake message of the target application is manually and empirically identified and marked, and another mark is made on a message of another application for processing on a machine learning platform. A relatively convenient manner is to copy sent and received messages on a terminal side. A specific quantity of samples used for training rules are needed, and usually packets of hundreds or thousands of streams are needed. For example, in an implementation, samples used for training rules are messages of 1,000 streams of a target application and messages of 1,200 streams of another application. In an implementation, to improve machine learning efficiency, obtained samples may be manually and empirically screened first.

The foregoing sample is parsed using a secure encrypted transmission protocol, to obtain a length, a type, and a value of a field in the message, and certainly an order of a group of fields in the handshake message. Such information (namely, the length, the attribute, and the value of the field in the handshake message, and the order of the group of fields in the handshake message) obtained through parsing is processed using the machine learning platform, to train one or more rule sets corresponding to the target application. Each rule set includes one or more rules. A data stream corresponds to the target application only if a handshake message in the data stream meets all rules in the rule set. In addition, one or more rule sets of the target application have an "or" relationship. In an embodiment, a data stream corresponds to the target application provided that a handshake message in the data stream meets any one of the one or more rule sets. The machine learning algorithm used in this application is not limited, for example, a decision tree machine learning algorithm, especially a random forest algorithm, a C4.5 algorithm, or variants of these algorithms. When the decision tree machine learning algorithm is used, one or more tree models are output. In an implementation, for a tree model, each node in the tree model represents one application set, a root node represents an application set to which a sample not matched with a rule may correspond, and the application set may be preset, or may be set based on a sample that is input in current machine learning. A connection between two nodes in the tree model represents one or more rules. In an embodiment, two nodes in a connection relationship in a direction from a root node to a leaf node may be interpreted as an application subset that is selected from an application set corresponding to a node based on a rule corresponding to the connection. The application subset may be stored on a node at the other end of the connection. There is only one application until the leaf node, and an identifier may be set on the leaf node to indicate the leaf node corresponding to the target application. In this way, each leaf node corresponds to one rule set, and the rule set includes rules represented by connections from the leaf node to the root node. A rule set corresponding to all nodes from a leaf node that represents the target application to the root node is a rule set corresponding to the target application.

When a tree model includes a plurality of leaf nodes that represent the target application, a plurality of rule sets corresponding to the target application may be obtained in this tree model.

Certainly, machine learning may be performed using a plurality of groups of samples, the plurality of groups of samples include handshake messages of different streams of the target application, and rule sets obtained through such learning may be different. Different rule sets learned using a plurality of groups of samples may be used as rule sets used to identify the application such that the determined rule sets corresponding to the application can be more comprehensive, and an identification rate can be improved during identification of a message in a network.

In an implementation, the foregoing information obtained through parsing from the plurality of messages may be expressed as a matrix such that the matrix is trained using the machine learning algorithm. For example, a row of the matrix may be used to describe one or more handshake messages of a stream, and a column of the matrix may be a column used to describe a length, a type, or a value of a field, or an order of fields in a message. A sample includes a handshake message of the target application. For example, the target application is an application A. The sample further includes a message of another application, for example, an application B and an application E. In this way, a handshake message of the application A is marked as a positive sample, and the message of the other application is marked as a negative sample. Correspondingly, one column in the matrix is specially used to record whether a message of each row is a positive sample or a negative sample.

In addition, when a plurality of rule sets obtained using a machine learning method and a mapping relationship between these rule sets and applications are added to a library, filtering and management may be performed such that identification of a data stream is more accurate, and subsequent re-identification and re-determining are reduced. In this way, the foregoing method can be more practical. For example, if a learned rule set and a mapping relationship may be the same as an existing rule set in a library, the rule set and the mapping relationship may be not added. For another example, if different corresponding applications may be learned based on a same rule set in different times of learning, the rule set and a corresponding mapping relationship may be not added. For another example, if a learned rule set may be a subset of an existing rule set in a library, the rule set and a corresponding mapping relationship may be not added. For another example, if a learned rule set may include a subset that is the same as an existing rule set in a library, the existing corresponding rule set in the library may be replaced with the learned rule set and a corresponding mapping relationship. How to perform filtering and management is not limited in this application.

In an implementation, each rule set in a maintained library corresponds to only one application, rule sets are not repeated, and the rule sets do not have an inclusion relationship. Apparently, such a library can more accurately indicate an application corresponding to a data stream using a rule set.

A type of an application corresponding to a to-be-processed message is not limited in the foregoing machine learning method. Because a sample may be obtained in the foregoing plurality of manners, a handshake message intercepted or copied in the network may be matched using a rule in the foregoing determined rule set, thereby greatly improving an identification rate and identification accuracy of an encrypted data stream of an application that cannot be identified or is identified with low accuracy in other approaches. For example, currently, there are dozens of applications that use a TLS tunnel technology named meek to obfuscate traffic so as to evade firewall detection. A message of such applications that is transmitted in the network carries an SNI of any value. However, data of a plurality of applications is deployed on a content delivery network (CDN) server, and a domain name (usually carried in a common name field) of the CDN server cannot indicate an application. In addition, because the data of the plurality of applications is deployed on the CDN server, the CDN server, as a server, receives a handshake message from a client, and even if an SNI in the message is erroneous or inaccurate, the CDN may still perform subsequent operations of establishing a connection and sending data. Therefore, in a manner of determining an application corresponding to a message by parsing information carried in an SNI or a common name, a message of such an application that is transmitted in the network cannot be identified or cannot be accurately identified. Among such applications, applications such as TOR and PSIPHON are common and considered as VPN tools for Internet censorship circumvention.

A method for identifying an encrypted data stream and related technical details are described below using the TLS protocol as an example. A TLS stream may be used to represent an encrypted data stream. With reference to the technical details, a method, an apparatus, and the like described below, for an encrypted stream using another secure encrypted transmission protocol such as the SSL protocol or the DTLS protocol, an identification method and many implementations and descriptions are similar to those of the encrypted stream using the TLS protocol, and how the identification method and many implementations and descriptions are implemented can be figured out by a person skilled in the art. For brevity of this application, identification of an encrypted stream using another secure encrypted transmission protocol is not described in detail.

PSIPHON is used as an example. The foregoing method is used to perform machine learning on a handshake message sent by a version of PSIPHON, to extract a rule set corresponding to this application. In this example, data of the PSIPHON application is transmitted using a TLS stream. An extracted rule set includes the following eight rules. In other words, if a handshake message of a TLS stream meets the following eight rules, the TLS stream is a data stream of PSIPHON. It should be understood that expressions (for example, a format, a symbol used for connecting types in different levels, and a symbol used for connecting values of different fields) of the rules described below are merely examples for ease of understanding. An expression of a rule is not limited in this application. There are the following three rules for a Client Hello message.

(1) ClientHello_len=185.

This rule indicates that a value of a field whose type is len in the Client Hello message is 185. The field whose type is len indicates a length of the Client Hello message, and this rule indicates that the length of the Client Hello message is 185 bytes.

(2) ClientHello_cipher_suites=0xc02b_0xc00a_0xc009_ 0xc023_0xc007_0xc02f_0xc014_0xc013_0xc011_ 0xc005_0xc004_0xc003_0x0039_0x0033_0x003d_ 0x0035_0x003c_0x002f_0x000a_0x0005_0x0004_0x00ff This rule indicates that a value of a field whose type is cipher_suites in the Client Hello message is equal to a character string on the right of the equal sign, that is, is equal to 0xc02b_0xc00a_0xc009_0xc023_0xc007_0xc02_ 0xc 014_ 0xc013_0xc011_0xc005_0xc004_0xc003_0x0039_ 0x0033_0x003d_0x0035_0x003c_0x002f_0x000a_0x00 05_0x0004_0x00ff.

(3) ClientHello_extension_0x0023=0

This rule indicates that a value of an extension (extension) field whose type is 0x0023 in the Client Hello message is 0. A message type herein is indicated by information carried in an unparsed message, and is not converted into a type that is obtained through parsing and that is indicated by 0x0023.

There is the following one rule for a Server Hello message.

(4) ServerHello_len=80.

This rule indicates that a length of the Server Hello message is 80.

There are the following three rules for a Certificate message.

(5) Certificate_subject_CN=ss1334326.cloudflaressl.com

This rule is similar to a conventional solution, where CN is an acronym for a common name field in the Certificate message, and indicates that the common name field in the Certificate message is a specific value, namely, ss133432.6 cloudflaressl.com.

(6) Certificate_subject_publickey_algorithm=RSA.

This rule indicates that a value of a public key algorithm field of a subject type in the Certificate message is Rivest-Shamir-Adleman (RSA).

Actually, the public key algorithm in this condition is similar to a version number field and is a fixed field. A type and a length of the public key algorithm are fixed values, and are default in a handshake message. Therefore, this rule is specific to the default field described above.

(7) Certificate_extension_order=authKeyIdExt_subjKeyId Ext_ basicConstraintsExt_keyUsageExt_cr 1DistPointsExt_ certPoliciesExt This rule represents an order rule. In an embodiment, the Certificate message includes six extension fields that appear in an order in the rule. The order is authKeyIdExt, subjKeyIdExt, basicConstraintsExt, keyUsageExt, crlDistPointsExt, and certPoliciesExt.

There is the following one rule for a Server Hello Done message.

(8) ServerHelloDone_ver=0x0303.

This rule indicates that a value of a field whose type is version (ver) in the Server Hello Done message is 0x0303. This field is a default mandatory field in a protocol. A type of the field is fixed and a length is fixed to 2 bytes. This may also explain why only a version and a value of this field are matched in this condition.

The foregoing eight rules are included in a same rule set. In an embodiment, only if all handshake messages in a TLS stream meet all the foregoing eight rules, it can be considered that the TLS stream corresponds to the PSIPHON application or the TLS stream matches the PSIPHON application. In a solution in other approaches, a domain name of a TLS stream is obtained by parsing an SNI field or a common name field in a handshake message. However, because an SNI of the PSIPHON changes randomly, whether a TLS stream matches the PSIPHON application cannot be identified by parsing content of the SNI. In addition, in this solution, a common name is also used as one of conditions. However, PSIPHON uses a general-purpose CDN as a server, and a certificate is not specific to PSIPHON. Therefore, in other approaches of using only content of the common name, it is very likely that a TLS corresponding to PSIPHON is identified as corresponding to another application, and identification accuracy is very low. In the solution of this application, content of the common name and seven other rules are included in a same rule set, and a TLS stream matches the PSIPHON only when the TLS stream meets the eight rules, and therefore the stream that matches the PSIPHON application can be accurately identified.

In the machine learning method described in this application, handshake messages of a plurality of TLS streams of the PSIPHON application are analyzed, and a plurality of rule sets corresponding to the PSIPHON application can be obtained. For example, the foregoing rule set including the eight rules is used in different network environments to test an effect of using the rule set to identify a stream corresponding to the PSIPHON application in the network. In an embodiment, in the plurality of network environments, TLS streams are transmitted using the PSIPHON application, and the TLS streams transmitted using the PSIPHON application in these network environments are matched using the rule set. For example, the network environments include the following a TLS stream is transmitted using a PSIPHON application running in five different operating systems WINDOWS 7, WINDOWS 10, ANDROID 4.4.2, ANDROID 5.1.1, and ANDROID 6.0.0, a plurality of versions of PSIPHON clients 65, 91, 103, 108, 112, 113, 114, 123, 125, 128, 130, and 133 are used, and TLS streams are separately transmitted using six different network access points, where the network access points are specifically located in China, Japan, the United States, the United Kingdom, Singapore, and the Netherlands. In the foregoing plurality of network environments, precision of identifying a stream of the PSIPHON application is 100%, and a recall rate is 99.19%. The precision indicates a percentage of real streams of the PSIPHON application in the identified streams of the PSIPHON application, that is, whether identification is correct. The recall rate indicates a percentage of the identified streams of the PSIPHON application in the network in streams of the PSIPHON application in intercepted or copied data streams in the identification process, that is, an identified fraction of the existing streams of the target application. It can be learned that the determined rule set reflects a mapping relationship between a combination (a value, a length, a type, an order of a plurality of fields, and the like) of content of fields in a TLS handshake message and the PSIPHON application. Therefore, compared with an existing solution, when the rule set described in this application is used to identify a TLS stream, an identification rate and identification accuracy of the TLS stream can be greatly improved, and correct identification is achieved.

Certainly, as described above and described in FIG. 5B, in some cases, whether an encrypted stream of a handshake message corresponds to an application can be identified by matching only one handshake message. For example, only a Client Hello message is matched, or only a Server Hello message is matched, or only a Certificate message is matched. In this case, all rules in a rule set of an application come from a same message. A rule set of an application is described below. All rules in the rule set come from the Client Hello message. In an embodiment, only a Client Hello message of a data stream needs to match the following rule set, and then the data stream can be identified as corresponding to the application. The rule set includes the following rules.

ClientHello_ver=0x0303
ClientHello_CipherSuitesLength=32
ClientHello_CipherSuites=cca8cca9c02fc30c02bc02cc-013c009c014c00a009c009d002f0035c012000a
ClientHello_CompressionMethodsLength=1
ClientHello_CompressionMethods=0
ClientHello_ExtensionsNumbers=7.

The foregoing six rules are field rules in the rule set. A meaning of each rule is not described in detail herein. For details, refer to definitions of fields in a Client Hello message in the TLS protocol and the foregoing explanations of rules in the PSIPHON application. The following rule is an order rule. In an embodiment, an order of a group of extension fields Extensions in the Client Hello message is specified, where each extension field is represented by a type of the extension field.

Extensions order=0x0005_0x000a_0x000b_0x0023_0x000d_0xff01_0x0012

For example, if a Client Hello message includes the following group of extension fields Extensions, the Client Hello message matches the order rule.

```
Extensions Items (Type, Length, Value): 0x0005 5 0100000000
Extensions Items (Type, Length, Value): 0x000a 10 0008001d001700180019
Extensions Items (Type, Length, Value): 0x000b 2 0100
Extensions Items (Type, Length, Value): 0x0023
Extensions Items (Type, Length, Value): 0x000d 14
000c0401040305010503020203
Extensions Items (Type, Length, Value): 0xff01 1 00
Extensions Items (Type, Length, Value): 0x0012 0
```

In addition, a rule set of an application may include only one type of rule. In other words, the rule set includes only order rules or only field rules. In an embodiment, some streams may be identified only using an order rule or a field rule. In an implementation in which the rule set includes only a field rule, the rule set includes a plurality of field rules, and at least one field rule includes a constraint on a length. An example is described below. A rule set in this example includes one rule, and the rule is an order rule. The rule set is as follows.

Certificate_subject_order=CountryName_StateOrProvinceName_LocalityName_OrganizationName_OrganizationUnitName_CommonName If a stream matches the rule, it indicates that an order of a group of subject fields in a Certificate message in the stream is CountryName_StateOrProvinceName_LocalityName_OrganizationName_OrganizationUnitName_CommonName.

For example, a Certificate message that includes the following group of subject fields meets the foregoing rule set:

subject: rdnSequence(0)
◢ rdnSequence:6 items (id-at-commonName=www.update.microsoft.com . . . )
▷ RDNSequence item: 1 item (id-at-countryName=US)
▷ RDNSequence item: 1 item (id-at-stateOrProvinceName=Washington)
▷ RDNSequence item: 1 item (id-at-localityName= Redmond)
▷ RDNSequence item: 1 item (id-at-organizationName= Microsoft)
▷ RDNSequence item: 1 item (id-at-organizationUnitName=DSP)
▷ RDNSequence item: 1 item (id-at-commonName= www.update.microsoft.com).

When certificates are generated in batches by malware or rogue software, a value of a common name in a Certificate message is tampered with or forged. According to other approaches, software is identified by identifying a domain name (for example, MICROSOFT in the foregoing example) in the value of the common name, and erroneous identification is easily caused. However, if a rule set similar to the foregoing example is used, rules in the rule set limit an order of subject fields in a Certificate message, and regardless of how values of the fields are tampered with, the order does not change such that a correct application corresponding to the message can be identified.

A TLS handshake message is used as an example below to describe a process in which a monitoring device identifies an encrypted data stream, and all encrypted streams received by the monitoring device use the TLS protocol. It should be understood that a similar implementation may also be used for an encrypted stream using another secure encrypted transmission protocol, and details are not described in this application.

One field rule or order rule is specific to one handshake message. Therefore, in an implementation, if the monitoring device determines that one handshake message is intercepted (for example, by parsing the handshake message), the monitoring device matches the handshake message before another handshake message of the data stream arrives. It can be learned from the foregoing example descriptions of the handshaking phase that handshake messages are transmitted in order. After a received handshake message is parsed, the handshake message may be matched with a rule set in a library. If it is learned based on a mapping relationship between a rule set and an application in the library that a rule set matching the handshake message is uniquely mapped to an application, a stream in which the handshake message is located corresponds to the application, a matching process ends, and a subsequently obtained handshake message of the stream is not matched, but it is considered that all messages of the stream that are subsequently received by the monitoring device correspond to the application. In this way, the stream can be quickly identified, and resources of the monitoring device can be saved. In an implementation, matching may be performed after a plurality of intercepted handshake messages are parsed. For a matching process, refer to the following descriptions of matching one handshake message. For example, the plurality of handshake messages are matched based on a rule type. In this way, a matching procedure can be simplified, batch processing can be implemented, and a matching procedure does not need to be separately performed for each handshake message.

Because the Client Hello message is a handshake message that is transmitted first in a TLS handshaking procedure in a time sequence and definitely exists in the TLS handshaking procedure, in an implementation, it may be first determined, through parsing, whether a Client Hello message of a stream is received. In this way, it may be determined whether a message of a TLS stream is received. If the message of the TLS stream is received (in other words, a Client Hello message of the stream is obtained), a rule is matched starting from the Client Hello message. Apparently, applications corresponding to some streams can be identified faster. In rule sets corresponding to these applications, there is a rule set in which all rules are used for matching the Client Hello message. If no Client Hello message of a stream is obtained, the stream is not a TLS stream, and it may be directly determined that identification cannot be performed using a rule set, in other words, matching fails. Actually, in the technical solutions described in this application, rule sets corresponding to many applications include a rule subset corresponding to a field in the Client Hello message. Certainly, rule sets corresponding to some applications do not include the rule subset corresponding to the field in the Client Hello message. This means that matching of the Client Hello message may be skipped for these applications.

Further, after it is determined that a handshake message (which may be referred to as a message A, for example, a Client Hello message) is received, the handshake message may be parsed to obtain information such as a length, a type, and a value of a field in the message, and an order of a plurality of fields in the message, and then matching is performed on the information using a rule in a library. All fields of the handshake message may be parsed, or some fields of the handshake message may be parsed. In an implementation, after a name of the handshake message is obtained through parsing, that is, a type of the handshake message is determined, it may be that only a field related to a rule that is stored in the library and that is of this type of handshake message is parsed. In an embodiment, fields corresponding to a plurality of rules of this type of handshake message may be obtained from stored mapping between a rule set and an application, and a field that is in the message and that corresponds to a rule is parsed. In this way, a part that needs to be parsed in the message may be selected purposefully. In this way, load of the monitoring device is relieved, and message processing efficiency can be improved in such a scenario of parallel transmission of a plurality of streams in an actual network environment. Similarly, when a plurality of received handshake messages are parsed together, after names of the plurality of handshake messages are determined, based on a rule set stored in the library or based on a rule set corresponding to an application that needs to be identified and that is indicated by a user or a service requirement, messages corresponding to rules in these rule sets and fields in the messages may be parsed.

In an implementation, matching may be performed for each rule. When a rule is matched, an application subset corresponding to the rule is queried, and after rule matching is completed for the packet, an intersection set (∩) of a plurality of obtained application subsets is obtained, to obtain an application set that matches the message A. If the application set includes only one element, the element is an application corresponding to a TLS stream in which the message A is located, and an identification process ends. If the application set includes a plurality of applications, another message (which may be referred to as a message B, for example, a Server Hello message or a Certificate message) of a data stream in which the message A is located may be matched in the foregoing manner or the following another manner. For example, only a rule set that can match the message A and that is in rules related to the message B in rule sets corresponding to the foregoing application set is matched, to further narrow down the foregoing application set. If the narrowed application set includes only one element, the element is an application corresponding to a TLS stream in which the message A and the message B are located, and an identification process ends. If the narrowed application set still includes a plurality of applications, a matching process similar to the foregoing matching process may be performed on another handshake message in a TLS stream in which the message A and the message B are located, until an application corresponding to a TLS stream in which the message A is located is identified.

Certainly, if an empty application subset appears in the foregoing process, the matching procedure may be ended, and it is considered that matching with an application in the library fails.

In an implementation, matching may be performed for each type of rules. In an implementation, rules are classified into two types, namely, the field rule and the order rule described above. In another implementation, rules are classified into three types the order rule described above, a rule used to match a length in the field rule, and a rule in the field rule except the rule used to match a length. Certainly, how to classify rules into types is not limited in this application. The message A is still used for description. A plurality of types of rules may be matched in parallel, to respectively obtain a matched rule subset. The rule subset may be an empty set that indicates that this type of rule does not include a rule that successfully matches the message, and then a union set (∪) of the plurality of rule subsets is obtained, to obtain a rule set corresponding to the message, or the types of rules are matched in a specific order, and matched rule subsets are continuously added to a rule set, until a rule set that matches the message A is obtained. For example, a type of rule (referred to as a type-A rule, which may be any type of rule mentioned above) is first matched, a rule subset A of type-A rules that match the message A is selected, and then another type of rule (referred to as a type-B rule, which may be any type of rule that is mentioned above and that is different from the type-A rule) is matched, and a type-B rule that matches the message A is added to the rule subset A, or when another type of rule is being matched, a type-B rule that is in a combination relationship with the rule subset is obtained based on the previously obtained rule subset A and a rule set in a library. For example, rule sets that include the rule subset A are {{A}, {B}, {C}}, {{A}, {D}}, and {{B}, {C}, {F}}. Both the rule subsets {B} and {D} are type-B rules specific to the message A, and {C} is a type of rule specific to the message B. In this case, when the rule subsets {B} and {D} are used to match the message A, it is found that the rule subset {B} matches the message A, and in this way, the rule set {{A}, {B}, {C}} that may correspond to the message A is obtained. Then, a rule in the rule subset {C} is used to match the received message B, and if the matching succeeds, an application corresponding to a stream in which the message A and the message B are located is an application corresponding to the rule set {{A}, {B}, {C}}. If the matching fails, identification of a stream in which the message A and the message B are located fails.

It should be noted that, matching may be performed sequentially in the foregoing order of obtaining handshake messages or in an order of exchanging handshake messages in the handshaking procedure. An advantage is that after a packet with an earlier time sequence is received, the packet may be matched before a subsequent handshake message arrives, and if the matching succeeds, a matched application can be obtained without a need to consider the subsequent handshake message. This apparently saves resources of the monitoring device, and can faster identify a stream in a timelier manner. For example, matching may be started after a Client Hello message is received. Certainly, a plurality of handshake messages may be matched together after the plurality of handshake messages are received. For example, matching is started after a Client Hello message and a Server Hello message are received, or matching is started after a Client Hello message and a Certificate message are received, or matching is started after a Client Hello message, a Server Hello message, and a Certificate message are received. For example, respective rules of a plurality of handshake messages are matched in parallel, and then a rule set that matches the plurality of handshake messages is obtained based on rules matching the plurality of handshake messages and a rule set in a matching information library, and then an application corresponding to the encrypted stream is obtained. Alternatively, respective rules of packets are matched in parallel, to obtain a plurality of application subsets corresponding to a plurality of rule subsets corresponding to the plurality of messages, and an intersection set of the plurality of application subsets is obtained. Because rules in many rule sets are specific to the three packets, parallel processing can improve efficiency. Certainly, matching may be performed after all handshake messages are received, or the like.

In conclusion, the monitoring device may process a plurality of messages of a same stream in parallel, or may process one or more messages in parallel using a plurality of types of rules. With reference to the foregoing descriptions, a person in the art should understand that there are a plurality of implementation methods of the matching process. A procedure and a time sequence in which the monitoring device specifically matches one or more messages of a stream are not limited in this application. In addition, the monitoring device may receive handshake messages of a plurality of streams at the same time, and the monitoring device may process handshake messages of different streams in parallel. For details, refer to the foregoing descriptions of an implementation of matching a handshake message of one stream. This is not limited in this application either, and details are not described either.

For ease of understanding, a matching process of a handshake message of a TLS stream is described below using an example with reference to FIG. 6. It should be understood that, the following process and matched information management manner may also be used for an encrypted data stream using another secure encrypted transmission protocol. In an embodiment, a linked table, an array, and a table are used. Certainly, how to store and manage matched information in a library is not limited in this application.

In a handshaking procedure, a Client Hello message (CH), a Server Hello message (SH), and a Certificate message (CER) with earlier time sequences usually have corresponding rule subsets in a rule set. In the example described below, the foregoing three handshake messages have respective rule subsets with definite numbers, and rules corresponding to other handshake messages may also have respective rule subsets with definite numbers. The monitoring device stores a plurality of rule subsets of each of the foregoing three handshake messages, a rule set including at least one of the rule subsets, and a mapping relationship between a rule set and an application. For example, a linked list may be used to store the rule set, and the rule subsets of the CH, the SH, and the CER may be respectively stored in a level of linked list. However, a rule set of an application usually includes rule subsets of several handshake messages in other plurality of subsequent handshake messages. Therefore, rule subsets of the other plurality of handshake messages may be managed in a same level of linked list, or rule subsets of the other plurality of handshake messages are managed using another data structure. For example, an array is used.

In this way, when the foregoing handshake messages of a stream are received, the handshake message may be matched with a rule subset, and a sequence number of a hit rule subset is returned. Each time a handshake message of a stream is matched, it is checked whether a union set of rule subsets that the handshake message hits can uniquely correspond to an application. If the union set can uniquely correspond to an application, identification of the stream succeeds, and a matching procedure ends. If the union set corresponding to an application set, matching continues after another handshake message of the stream is obtained. If there is no corresponding application, the matching fails or when the handshake message is a handshake message after the CH, SH, and CER packets, another handshake message of the stream continues to be matched, until a corresponding application is matched or all messages of the stream are matched. Specifically, after a rule subset of a subsequent single handshake message is matched, rule sets that are stored on the monitoring device and that include the rule subset may be queried, and then it is determined whether the rule sets include a rule set that can match a plurality of messages of the stream. If the rule sets include the rule set that can match the plurality of messages of the stream, the matching succeeds. If the rule sets include no rule set that can match the plurality of messages of the stream, it indicates that the subsequent message needs to be changed to continue matching.

The monitoring device uses a SeqInfo data structure to manage the rule set. In an embodiment, rule subsets in a rule set are arranged using a linked list in an order of exchanging handshake messages in a handshaking procedure. For example, a linked list CH_SH indicates that a rule set includes a rule subset corresponding to the CH and a rule subset corresponding to the SH but does not include a rule subset corresponding to the CER, a linked list CH_CER indicates that a rule set includes a rule subset corresponding to the CH and a rule subset corresponding to the CER but does not include a rule subset corresponding to the SH, and a linked list CH_SH_CER indicates that a rule set includes a rule subset corresponding to the CH, a rule subset corresponding to the CER, and a rule subset corresponding to the SH. In this example, CH_SH, CH_CER, and CH_SH_CER linked lists mounted after numbers of different rule subsets corresponding to the CH are different, and at least one of the CH_SH, CH_CER, and CH_SH_CER linked lists may be used. Certainly, CH_SH, CH_CER, and CH_SH_CER linked lists may alternatively be some of linked lists mounted after the rule subset, and there may further be anther rule corresponding to another handshake message after the linked lists. For example, the other rule may be a rule used to limit an order of a plurality of handshake messages of a stream. Alternatively, no linked list may not be mounted, or a linked list corresponding to another handshake message may be included. Because there are various applications, the applications also correspond to various linked list forms of rule sets. A possible linked list form of rule sets is not limited in this application. In this way, after a rule subset corresponding to the CH is obtained through parsing, another message is received such that only a part of a linked list mounted after the rule subset is used for matching based on a name of the handshake message. In this way, a query range can be narrowed down, and a final corresponding application can be matched faster.

The following describes a process of matching one data stream when the foregoing data structure is used to maintain a mapping relationship between a rule set and an application. A rule subset corresponding to the CH has a number beginning with 1, and a numeral after 1 is a number of a rule subset in the rule subset corresponding to the CH. It should be understood that numbers may be consecutive or nonconsecutive. Similarly, a rule subset corresponding to the SH has a number beginning with 2, and a rule subset corresponding to the CER has a number beginning with 3. For example, in this example, the monitoring device stores a mapping relationship between a rule set and an application shown in Table 1. Table 1 lists only rule sets including a rule subset 10+20+30, one column represents a rule subset of one type of handshake message, a column name in the table represents a handshake message corresponding to the column, one row represents one rule set, and is represented by SeqRule in table, a subsequent numeral is an index value of the rule set indicated by the row, and NA indicates that the rule set of the row does not include a rule subset corresponding to a handshake message of the column. Table 1 is merely used for ease of understanding. In actual implementation, a relationship between a rule set and a rule subset is not necessarily managed in a form of a table, and a form of managing the mapping relationship between a rule set and a rule subset is not limited in this application.

TABLE 1

|           | CH | SH | CER | SKE | SHD | CKE |
|-----------|----|----|-----|-----|-----|-----|
| SeqRule 0 | 10 | 20 | 30  | 40  | 50  | 60  |
| SeqRule 1 | 10 | 20 | 30  | 41  | 50  | 61  |
| SeqRule 2 | 10 | 20 | 30  | 41  | 51  | 61  |
| SeqRule 3 | 10 | 20 | 30  | 41  | 50  | NA  |
| SeqRule 4 | 10 | 20 | 31  | NA  | NA  | NA  |

Figure 6:
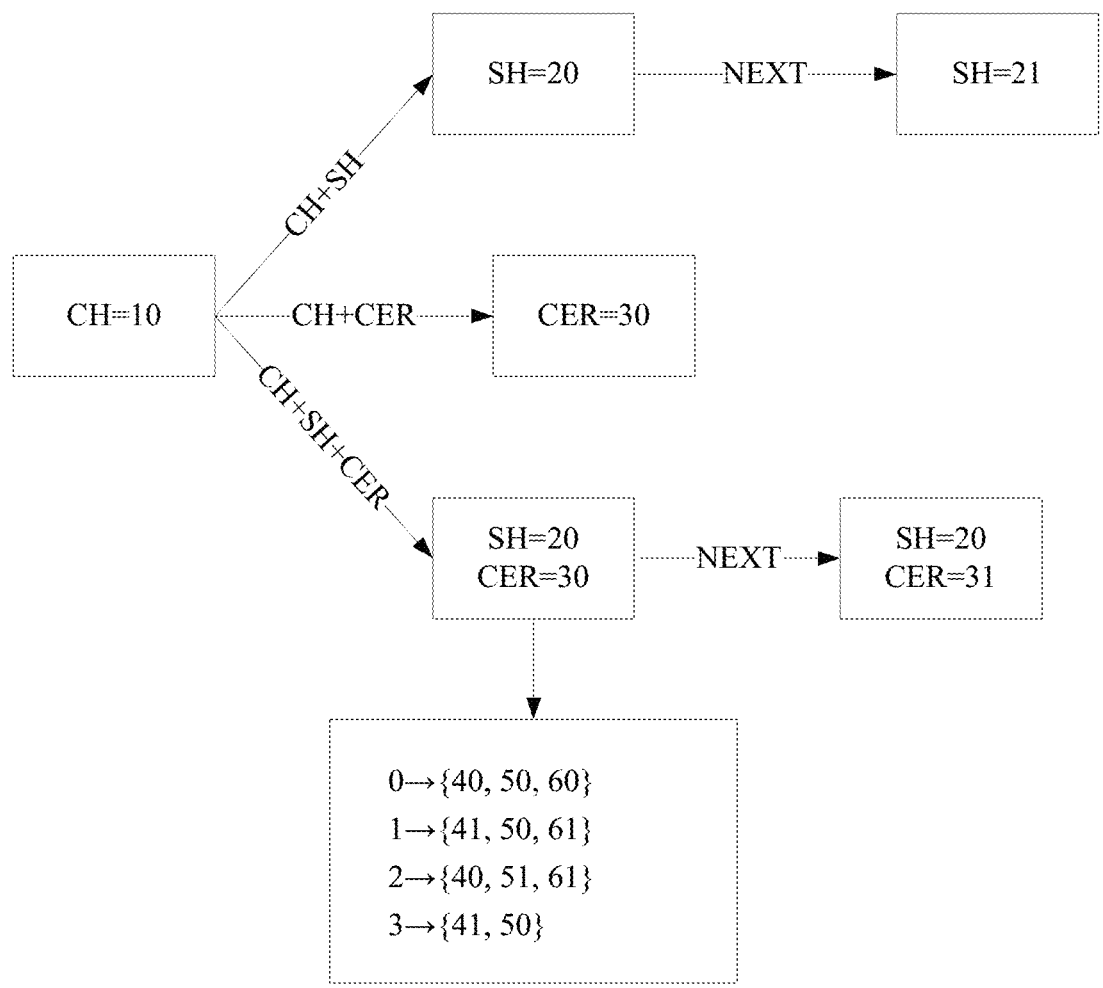
FIG. 6 is a schematic diagram of a matching process of a handshake message of a TLS stream according to this application.

FIG. 6 illustrates some rule subsets that may be used in a matching process. An arrow represents a node represented by a rectangular box to a node (also represented by a rectangular box) that may be matched in a next step. 1, 2, 3, 7, 8, and 9 in a table represent index values of a rule set.

As shown in FIG. 6, after query, a CH packet of a stream matches a rule subset 10, which is represented by CH=10 in the figure, and in this case, a SeqInfo data structure in which the CH=10 is located is found, and three linked lists CH_SH, CH_CER, and CH_SH_CER, are mounted in the SeqInfo data structure. Apparently, rule sets represented by the three linked tables include a same rule subset corresponding to the CH. After receiving an SH packet of the stream, a monitoring device parses the SH packet, and matches parts that correspond to the SH and that are in the two linked lists CH_SH and CH_SH_CER, to learn that the SH packet matches a rule subset 20, which is represented by SH=20 in the figure. Actually, a node that is in the linked list and that corresponds to CH=10 and SH=20 ("be corresponding to" indicates that the node meets a condition of CH=10 and SH=20) is matched in this case. The monitoring device then receives a CER packet of the stream, and after parsing the CER packet, matches a CH_SH_CER linked list after the node, to learn that the CER packet matches a rule subset 30, which is represented by CER=30 in the figure, and a node that is in the CH_SH_CER linked list and that corresponds to CH=10, SH=20, and CER=30 is matched in this case. It should be understood that two rule sets in which 10+20+30, 10+20+30+40, and the like are maintained at the same time cannot be used, and apparently, such a stream that meets 10+20+30 may match two applications. The figure also shows that a node that is a CH_SH linked list after CH=10 and that can carry a plurality of SHs, and in this way, query may be performed on a node that represents the SH, such as a node of SH=21 that is described in the figure and that is indicated by NEXT on a node representing SH=20, or a node of SH=20 and CER=31 that is indicated by NEXT after a node of SH=20 and CER=30 in a CH_SH_CER linked list.

In this example, rule subsets corresponding to handshake messages of other types are stored in a form of an array. For example, the array may be referred to as an ExtSeqInfo array. The foregoing node corresponding to CH=10, SH=20, and CER=30 further corresponds to an array structure. In an embodiment, a rule set that includes the three rule subsets CH=10, SH=20, and CER=30 further includes another rule or rule subset. In this case, a matching process of the stream is not completed. After receiving a handshake message of the stream, the monitoring device further needs to parse the handshake message and perform matching, to determine a rule subset that meets a condition, and then determines whether there is a rule set that is the same as a union set of the plurality of rule subsets. It should be noted herein that because there are many handshake messages, and one rule set usually includes only a subset of subsequent handshake messages, after a rule subset corresponding to a single handshake message after the CH, the SH, and the CER is queried, if the monitoring device does not include a rule set that is the same as a union set of rule subsets matching the stream, the rule subset of the handshake message may be discarded, and matching of a subsequent handshake message may be continued.

For example, a Server Key Exchange packet (SKE) of the stream is received, it is learned through matching that the SKE hits a rule subset 40, an ExtSeqInfo array is traversed, a rule set including the rule subset 40 is found, and it is learned that rule sets whose index values are 0 and 2 include the rule subset. However, it is also found that neither of the two rule sets includes the rule subset 10+20+30. Therefore, the stream fails to match the rule set 0 and the rule set 2, and matching needs to be continued. Sequence numbers of the rule set 0 and the rule set 2 may be recorded first. It should be understood that, in this example, matching the SKE packet after the CER packet is matched means that the SKE packet is transmitted after the CER packet is transmitted in a handshaking procedure of the stream.

Similarly, a received Server Hello Done packet (SHD) of the stream is parsed, it is learned through matching that the SHD hits a rule subset 50, an ExtSeqInfo array is traversed, a rule set including the rule subset 50 is found, and it is learned that rule sets whose index (index) values are 0 and 1 include the rule subset. However, it is also found that neither of the two rule sets includes the rule subset 10+20+30. Therefore, the stream fails to match the rule set 0 and the rule set 1, and matching needs to be continued. Sequence numbers of the rule set 0 and the rule set 1 may be recorded first. It should be understood that whether the rule set further includes the rule subset 10+20+30 instead of 10+20+30+40 is determined. As described above, because no rule set including 10+20+30+40 is matched during matching of the SKE, the rule set that is hit by the SKE is ignored during matching of the SHD. Certainly, if the rule set used in this example does not include a rule subset corresponding to some handshake message, the handshake message may be skipped in a matching process.

Then, a received Client Key Exchange packet (CKE) of the stream is parsed, it is learned through matching that the CKE hits a rule subset 60, an ExtSeqInfo array is traversed, a rule set including the rule subset 60 is found, and it is learned that rule sets whose index values are 0 and 3 include the rule subset. The rule set 3 further includes the rule subset 10+20+30, and therefore the stream matches the rule set 3.

In other approaches, an order of transmitting handshake messages of a TLS stream may be used as a rule to identify the stream. Therefore, the rule set described in this application may further include such a rule that indicates an order of transmitting a plurality of handshake messages, for example, the rule is referred to as a MsgSeq rule, and a MsgSeq rule numbered 122334 is shown in the figure.

Therefore, if the foregoing rule set 3 includes such a rule that indicates an order of transmitting a plurality of handshake messages, whether an order of handshake messages of the stream meets a MsgSeq rule included in the rule set 3 needs to be checked. If the order of handshake messages of the stream meets the MsgSeq rule included in the rule set 3, the TLS stream matches the rule set 3, and an application corresponding to the rule set 3 is an application corresponding to the TLS stream. If the order of handshake messages of the stream does not meet the MsgSeq rule included in the rule set 3, the rule set 3 is not hit, and another received handshake message of the stream needs to be parsed. Certainly, if the foregoing rule set 3 does not include a MsgSeq rule, the TLS stream matches the rule set 3, and an application corresponding to the rule set 3 is an application corresponding to the TLS stream.

Figure 7:
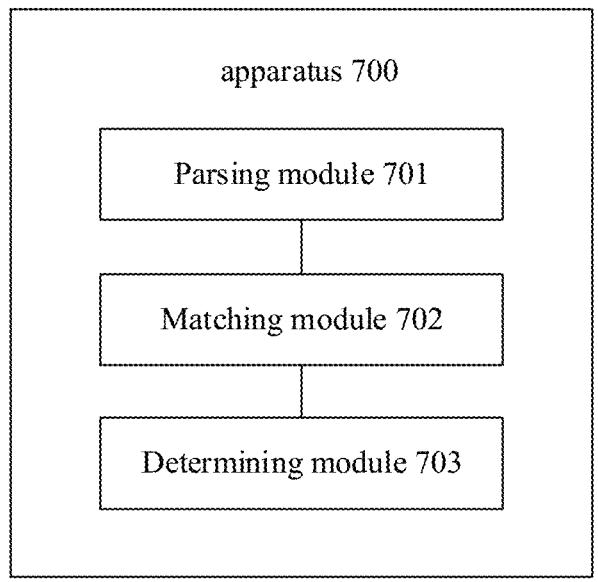
FIG. 7 is a schematic diagram of an apparatus for identifying an encrypted stream in this application.

FIG. 7 is a schematic diagram of an apparatus 700 for identifying an encrypted data stream. The apparatus includes a parsing module 701, a matching module 702, and a determining module 703. The apparatus 700 for identifying an encrypted data stream may identify an application corresponding to an encrypted data stream using one or more handshake messages of the encrypted data stream. In other words, the apparatus 700 for identifying an encrypted data stream may implement any one of the foregoing methods in this application. In addition, the monitoring device corresponding to FIG. 3 may also be considered as an implementation of the apparatus, where the packet processor corresponds to the parsing module 701, and the traffic identification engine corresponds to the matching module 702 and the determining module 703.

In one aspect, the parsing module 701 is configured to parse a plurality of handshake messages of an encrypted data stream according to a secure encrypted transmission protocol corresponding to the encrypted data stream, to obtain a plurality of fields included in the plurality of handshake messages, the matching module 702 is configured to determine, from a plurality of rule sets and based on the plurality of fields, a rule set that matches the plurality of handshake messages, where each of the plurality of rule sets includes at least one of a field rule or an order rule, the field rule is used to indicate a feature of a field, the order rule is used to indicate an order of a plurality of fields in a handshake message, and the fields in the plurality of handshake messages meet a rule in the matched rule set, and the determining module 703 is configured to determine, based on a mapping relationship between the matched rule set and an application, an application corresponding to the encrypted data stream.

For term explanations, implementations, and beneficial effects of this aspect, refer to a corresponding method in the foregoing descriptions, for example, the method shown in FIG. 5A. The matching module 702 may be configured to execute various implementations corresponding to the step of "determining, from a plurality of rule sets and based on the plurality of fields, a rule set that matches the plurality of handshake messages" described above. The determining module 703 may be configured to execute various implementations corresponding to the step of "determining, based on a mapping relationship between the matched rule set and an application, an application corresponding to the encrypted data stream" described above.

In another aspect, the parsing module 701 is configured to parse one handshake message of an encrypted data stream according to a secure encrypted transmission protocol corresponding to the encrypted data stream, to obtain a plurality of fields included in the handshake message, the matching module 702 is configured to determine, from a plurality of rule sets and based on the plurality of fields, a rule set that matches the handshake message, where each of the plurality of rule sets includes at least one of a field rule or an order rule, the field rule is used to indicate a feature of a field, the order rule is used to indicate an order of a plurality of fields in a message, and the fields in the handshake message meet a rule in the matched rule set, and the determining module 703 is configured to determine, based on a mapping relationship between the matched rule set and an application, an application corresponding to the encrypted data stream.

For term explanations, implementations, and beneficial effects of this aspect, refer to a corresponding method in the foregoing descriptions, for example, the method shown in FIG. 5B. The matching module 702 may be configured to execute various implementations corresponding to the step of "determining, from a plurality of rule sets and based on the plurality of fields, a rule set that matches the handshake message" described above. The determining module 703 may be configured to execute various implementations corresponding to the step of "determining, based on a mapping relationship between the matched rule set and an application, an application corresponding to the encrypted data stream" described above.

The apparatuses in the foregoing two aspects each may further include a training module. The training module is not shown in FIG. 7. The training module is configured to train a plurality of samples using a machine learning algorithm, to obtain at least one rule set corresponding to a target application, where whether the plurality of samples are handshake messages of an encrypted data stream corresponding to the target application is known, and the plurality of samples include the handshake message of the encrypted data stream corresponding to the target application.

The apparatuses in the foregoing two aspects each may store the plurality of rule sets and the mapping relationship between a rule set and an application described above, for example, the identification information library described above.

Figure 8:
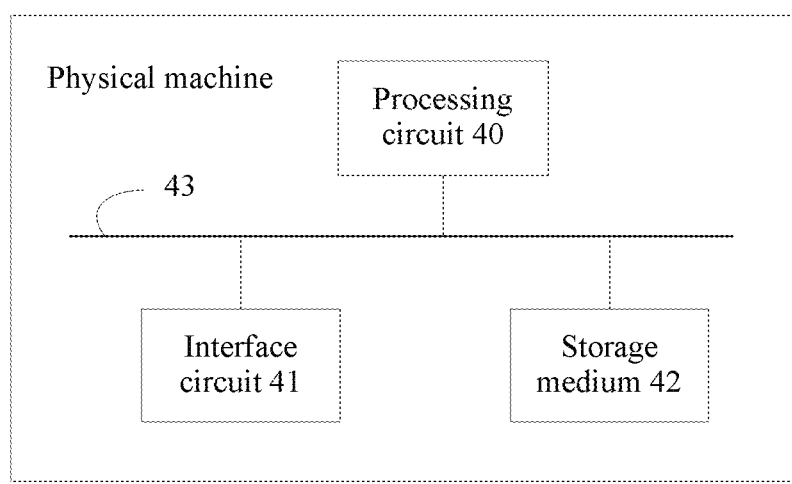
FIG. 8 is a schematic diagram of a physical machine that can be used as a device for identifying an encrypted stream in this application.

As shown in FIG. 8, an embodiment of the present disclosure provides a physical machine. The physical machine may be configured to perform any one of the foregoing methods, such as the methods corresponding to FIG. 5A and FIG. 5B. The physical machine includes a processing circuit 40, an interface circuit 41, a storage medium 42, and a system bus 43. The apparatus corresponding to FIG. 7 may also be disposed on the physical machine, and the processing circuit 40 implements each module of the apparatus 700 corresponding to FIG. 7 by running an instruction in the storage medium 42. Certainly, in an implementation, the storage medium 42 further stores the identification information library mentioned above. The physical machine may be the monitoring device shown in FIG. 3. The input interface and the output interface in FIG. 3 may be implemented by the interface circuit 41 in FIG. 8. The packet processor, the stream processor, the traffic identification engine, and the identification information library in FIG. 3 may be implemented by the processing circuit 40 by running the instruction in the storage medium 42.

The storage medium 42 is configured to store a computer executable instruction. The processing circuit 40, the interface circuit 41, and the storage medium 42 are connected to each other using the system bus 43. When the physical machine runs, the processing circuit 40 executes the computer executable instruction stored in the storage medium 42 such that the physical machine performs the method provided in the embodiments of the present disclosure.

The processing circuit 40 may be implemented using one or more processors. Only one processor is used as an example for description in FIG. 8. The processing circuit 40 may be a central processing unit (CPU). Alternatively, the processing circuit 40 may be another general purpose processor, a digital signal processor (DSP), an application-specific integrated circuit (ASIC), a field-programmable gate array (FPGA) or another programmable logic device, a discrete gate or a transistor logic device, a discrete hardware assembly, or the like. The general purpose processor may be a microprocessor, or the processor may be any conventional processor or the like.

The interface circuit 41 may be specifically a communications interface on the physical machine. The communications interface may be a wireless communications interface. For example, the wireless communications interface may be a wireless module of the physical machine. The processing circuit 40 receives data from or sends data to another device such as another physical machine using the interface circuit 41.

The storage medium 42 may include a volatile memory, for example, a random access memory (RAM), or the storage medium 42 may include a non-volatile memory, such as a read-only memory (ROM), a flash memory, a hard disk drive (HDD), or a solid-state drive (SSD), or the storage medium 42 may include a combination of the foregoing types of memories.

The storage medium 42 may include an underlying storage medium and a memory. The memory is coupled to the underlying storage medium, and is used as a cache of the underlying storage medium.

The system bus 43 may include a data bus, a power bus, a control bus, a status signal bus, or the like. In this embodiment, for clarity of description, various buses in FIG. 8 are marked as the system bus 43.

Optionally, this embodiment further provides a readable storage medium. The readable storage medium includes a computer executable instruction. When the physical machine runs, a processor of the physical machine executes the computer executable instruction such that the physical machine performs any method provided in the embodiments of the present disclosure.

Optionally, the readable storage medium in this embodiment may be the storage medium 42 shown in FIG. 8.

The foregoing descriptions about implementations allow a person skilled in the art to clearly understand that, for the purpose of convenient and brief description, division of the foregoing functional modules is merely used as an example for description. In actual application, the foregoing functions may be allocated to different functional modules and completed according to a requirement, that is, an internal structure of an apparatus is divided into different functional modules to complete all or some of the functions described above. For a detailed working process of the foregoing system, apparatus, and unit, refer to a corresponding process in the foregoing method embodiments. Details are not described herein again.

In the several embodiments provided in this application, it should be understood that the disclosed device, apparatus, and method may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. For example, the matching module 702 and the determining module 703 may be one module, for example, the traffic identification engine mentioned in FIG. 3. In addition, the displayed or discussed mutual couplings or direct couplings or communication connections may be implemented through some interfaces. The indirect couplings or communication connections between the apparatuses or units may be implemented in electronic, mechanical, or other forms.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It may be clearly understood by a person skilled in the art that, for the purpose of convenient and brief description, division of the foregoing functional modules is merely used as an example for description. In actual application, the foregoing functions may be allocated to different function modules and completed according to a requirement, that is, an internal structure of an apparatus is divided into different functional modules to implement all or some of the functions described above. For a detailed working process of the foregoing system, apparatus, and module, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of a software functional module.

When the integrated module is implemented in the form of a software functional module and sold or used as an independent product, the integrated unit may be stored in a computer-readable storage medium. Based on such an understanding, all or some of the technical solutions may be implemented in a form of a software product. The computer software product is stored in a storage medium, and includes several instructions for instructing a computer device (which may be a personal computer, a server, or a network device) or a processor to perform all or some of the steps of the methods described in the embodiments of the present disclosure. The storage medium is a non-transitory medium, and includes any medium that can store program code, such as a flash memory, a removable hard disk, a ROM, a RAM, a magnetic disk, or an optical disc.

The foregoing descriptions are merely specific implementations of the disclosure recorded in this application, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An encrypted data stream identification method, comprising:
    parsing a handshake message of an encrypted data stream to obtain a plurality of fields comprised in the handshake message, wherein the parsing is performed according to a secure encrypted transmission protocol corresponding to the encrypted data stream;
    determining a rule set of a plurality of rule sets comprising a plurality of field rules and a plurality of order rules, wherein the rule set is associated with an application corresponding to the encrypted data stream and matches the handshake message, and wherein determining the rule set comprises:
        determining whether the plurality of fields matches one or more field rules associated with a first subset of applications, wherein each of the field rules indicates a feature of a field and comprises at least one of a length of the field, a type of the field, or a value of the field; and
        determining whether an order of the plurality of fields comprised in the handshake message matches one or more order rules associated with a second subset of applications, wherein each of the order rules indicates the order of the plurality of fields in the handshake message;
    obtaining an intersection set of the first subset of applications and the second subset of applications; and
    determining the application corresponding to the encrypted data stream based on the intersection set of the first subset of applications and the second subset of applications and whether the plurality of fields matches the one or more field rules associated with the application and whether the order of the plurality of fields comprised in the handshake message matches the one or more order rules associated with the application.

2. The encrypted data stream identification method of claim 1, wherein the plurality of fields comprises a plurality of groups, wherein each of the plurality of groups corresponds to one of the handshake message, and wherein the encrypted data stream identification method further comprises matching the plurality of groups with rules from the plurality of rule sets in an order of receiving the handshake message to obtain the rule set that matches the handshake message.

3. The encrypted data stream identification method of claim 1, wherein the plurality of rule sets comprises a plurality of rules stored in a linked list, and wherein each node in the linked list stores a rule corresponding to a name of the handshake message.

4. The encrypted data stream identification method of claim 1, further comprising:
    parsing a plurality of names of the handshake message;
    determining a rule corresponding to the plurality of names; and
    parsing the plurality of fields of the handshake message that are indicated by the rule.

5. The encrypted data stream identification method of claim 1, wherein the handshake message comprises a plurality of handshake messages.

6. The encrypted data stream identification method of claim 1, further comprising:
    training a machine learning algorithm to obtain at least one rule set corresponding to a target application based on a plurality of samples of a plurality of encrypted data flows streams; and
    determining whether the plurality of samples are handshake messages of an encrypted data flow stream corresponding to the target application.

7. The encrypted data stream identification method of claim 1, wherein a plurality of handshake messages is parsed and separately matched in a batch.

8. The encrypted data stream identification method of claim 1, wherein determining the application corresponding to the encrypted data stream is whether the plurality of fields matches all the field rules associated with the application and whether the order of the plurality of fields comprised in the handshake message matches all the order rules associated with the application.

9. The encrypted data stream identification method of claim 1, further comprising:
    parsing a second message of the encrypted data stream; and
    obtaining a third subset of applications corresponding to the second message,
    wherein obtaining the intersection set further comprises obtaining the intersection set based on the first subset of applications, the second subset of applications, and the third subset of applications, and
    wherein determining the application corresponding to the encrypted data stream further comprises determining the application based on the intersection set of the first subset of applications, the second subset of applications, and the third subset of applications.

10. An encrypted data stream identification device, comprising:
a processor; and
a memory coupled to the processor and storing instructions that, when executed by the processor, cause the encrypted data stream identification device to be configured to:
parse a handshake message of an encrypted data stream according to a secure encrypted transmission protocol to obtain a plurality of fields comprised in the handshake message;
determine a rule set of a plurality of rule sets comprising a plurality of field rules and a plurality of order rules, in which the rule set is associated with an application corresponding to the encrypted data stream and matches the handshake message, wherein, to determine the rule set, the instructions further cause the encrypted data stream identification device to be configured to:
determine whether the plurality of fields matches one or more field rules associated with a first subset of applications, wherein each of the field rules indicates a feature of a field and comprises at least one of a length of the field, a type of the field, or a value of the field; and
determine whether an order of the plurality of fields comprised in the handshake message matches one or more order rules associated with a second subset of applications, wherein each of the order rules indicates the order of the plurality of fields in the handshake message;
obtain an intersection set of the first subset of applications and the second subset of applications; and
determine the application corresponding to the encrypted data stream based on the intersection set of the first subset of applications and the second subset of applications and whether the plurality of fields matches the one or more field rules associated with the application and whether the order of the plurality of fields comprised in the handshake message matches the one or more order rules associated with the application.

11. The encrypted data stream identification device of claim 10, wherein the plurality of fields comprises a plurality of groups, wherein each of the plurality of groups corresponds to the handshake message, and wherein the instructions further cause the processor to be configured to match the plurality of groups with rules from the plurality of rule sets in an order of receiving the handshake message to obtain the rule set that matches the handshake message.

12. The encrypted data stream identification device of claim 10, wherein the instructions further cause the processor to be configured to:
parse a plurality of names of the handshake message;
determine a rule corresponding to the plurality of names; and
parse the plurality of fields of the handshake message that is indicated by the rule.

13. The encrypted data stream identification device of claim 10, wherein the handshake message comprises a plurality of handshake messages.

14. The encrypted data stream identification device of claim 10, wherein a plurality of handshake messages is parsed and separately matched in a batch.

15. The encrypted data stream identification device of claim 10, wherein the instructions further cause the processor to be configured to:
parse a second message of the encrypted data stream; and
obtain a third subset of applications corresponding to the second message,
wherein obtaining the intersection set further comprises obtaining the intersection set based on the first subset of applications, the second subset of applications, and the third subset of applications, and
wherein determining the application corresponding to the encrypted data stream further comprises determining the application based on the intersection set of the first subset of applications, the second subset of applications, and the third subset of applications.

16. A computer program product comprising computer-executable instructions for storage on a non-transitory computer-readable medium that, when executed by a processor, cause an encrypted data stream identification device to:
parse a handshake message of an encrypted data stream according to a secure encrypted transmission protocol to obtain a plurality of fields comprised in the handshake message;
determine a rule set of a plurality of rule sets comprising a plurality of field rules and a plurality of order rules, in which the rule set is associated with an application and matches the handshake message, wherein, to determine the rule set, the computer-executable instructions further cause the encrypted data stream identification device to:
determine whether the plurality of fields matches one or more field rules associated with a first subset of applications, wherein each of the field rules indicates a feature of a field and comprises at least one of a length of the field, a type of the field, or a value of the field; and
determine whether an order of the plurality of fields comprised in the handshake message matches one or more order rules associated with a second subset of applications, wherein each of the order rules indicates the order of the plurality of fields in the handshake message;
obtain an intersection set of the first subset of applications and the second subset of applications; and
determine the application corresponding to the encrypted data stream based on the intersection set of the first subset of applications and the second subset of applications and whether the plurality of fields matches the one or more field rules associated with the application and whether the order of the plurality of fields comprised in the handshake message matches the one or more order rules associated with the application.

17. The computer program product of claim 16, wherein the plurality of fields comprises a plurality of groups, wherein each of the plurality of groups corresponds to the handshake message, and wherein the instructions further cause the encrypted data stream identification device to be configured to match the plurality of groups with rules from the plurality of rule sets in an order of receiving the handshake message to obtain the rule set that matches the handshake message.

18. The computer program product of claim 16, wherein the handshake message comprises a plurality of handshake messages.

19. The computer program product of claim 16, wherein a plurality of handshake messages is parsed and separately matched in a batch.

20. The computer program product of claim 16, wherein the instructions further cause the encrypted data stream identification device to be configured to:

parse a second message of the encrypted data stream; and
obtain a third subset of applications corresponding to the second message,
wherein obtaining the intersection set further comprises obtaining the intersection set based on the first subset of applications, the second subset of applications, and the third subset of applications, and
wherein determining the application corresponding to the encrypted data stream further comprises determining the application based on the intersection set of the first subset of applications, the second subset of applications, and the third subset of applications.

* * * * *